US012706058B2

(12) United States Patent
Lee et al.

(10) Patent No.: US 12,706,058 B2
(45) **Date of Patent: *Aug. 11, 2026**

(54) SOURCE DRIVER, DISPLAY DRIVING CIRCUIT INCLUDING THE SOURCE DRIVER, AND METHOD OF OPERATING THE SOURCE DRIVER

(71) Applicant: SAMSUNG ELECTRONICS CO., LTD., Suwon-si (KR)

(72) Inventors: Yongim Lee, Suwon-si (KR); Yonghun Kim, Suwon-si (KR); Junkwan Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 19/047,472

(22) Filed: Feb. 6, 2025

(65) Prior Publication Data

US 2025/0182703 A1 Jun. 5, 2025

Related U.S. Application Data

(63) Continuation of application No. 18/437,668, filed on Feb. 9, 2024, now Pat. No. 12,249,288.

(30) Foreign Application Priority Data

Feb. 22, 2023 (KR) ........................ 10-2023-0023790
Jun. 8, 2023 (KR) ........................ 10-2023-0073730

(51) Int. Cl.
*G09G 3/3275* (2016.01)

(52) U.S. Cl.
CPC ..... *G09G 3/3275* (2013.01); *G09G 2330/021* (2013.01)

(58) Field of Classification Search
CPC .................................................... G09G 3/3275
See application file for complete search history.

(56) References Cited

U.S. PATENT DOCUMENTS

| | | | |
|---|---|---|---|
| 8,436,801 B2 | 5/2013 | Hsu et al. |
| 9,558,698 B2 | 1/2017 | Chen et al. |
| 10,002,581 B2 | 6/2018 | Park |
| 2006/0274020 A1 | 12/2006 | Sng et al. |

(Continued)

FOREIGN PATENT DOCUMENTS

| | | |
|---|---|---|
| KR | 10-1885807 B1 | 8/2018 |
| KR | 10-2090607 B1 | 3/2020 |
| KR | 10-2293838 B1 | 8/2021 |

*Primary Examiner* — Chun-Nan Lin
(74) *Attorney, Agent, or Firm* — Sughrue Mion, PLLC

(57) ABSTRACT

A source driver is provided. The source driver includes: a switch circuit with first switches, which are respectively connected between a first charge sharing line and data lines; and a charge sharing controller configured to: receive pieces of first pixel data, which respectively correspond to the data lines, and pieces of second pixel data, which respectively correspond to the of first pixel data; output a charge sharing signal having an active level to a first group of switches among the first switches respectively connected to first data lines from among the lines, based on the pieces of first pixel data and the pieces of second pixel data corresponding to the first data lines being different from each other in at least two upper bits thereof.

8 Claims, 18 Drawing Sheets

(56) References Cited

U.S. PATENT DOCUMENTS

| | | | | |
|---|---|---|---|---|
| 2007/0030225 | A1 | 2/2007 | Moon et al. | |
| 2007/0290983 | A1 | 12/2007 | Kim et al. | |
| 2008/0136806 | A1 | 6/2008 | Lee et al. | |
| 2009/0207118 | A1* | 8/2009 | Lee | G09G 3/3688 345/98 |
| 2011/0141153 | A1* | 6/2011 | Lee | G09G 3/3614 345/88 |
| 2014/0320464 | A1* | 10/2014 | Ryu | G09G 3/3688 345/204 |
| 2015/0287374 | A1 | 10/2015 | Chen et al. | |
| 2016/0180776 | A1 | 6/2016 | Cho et al. | |
| 2019/0340994 | A1* | 11/2019 | Chen | G09G 3/3688 |
| 2022/0084478 | A1 | 3/2022 | Kim et al. | |
| 2022/0310012 | A1 | 9/2022 | Chung et al. | |

* cited by examiner

FIG. 5

| 2MSB_K-1 \ 2MSB_K | 00 | 01 | 10 | 11 |
|---|---|---|---|---|
| 00 | Maintain | Maintain | Rise | Rise |
| 01 | Maintain | Maintain | Maintain | Rise |
| 10 | Fall | Maintain | Maintain | Maintain |
| 11 | Fall | Fall | Maintain | Maintain |

FIG. 6

| 2MSB | DL_1 | DL_2 | DL_3 | DL_4 | DL_5 | DL_6 | DL_7 | DL_8 |
|---|---|---|---|---|---|---|---|---|
| DP_K-1 | 01 | 01 | 11 | 10 | 01 | 00 | 10 | 00 |
| DP_K | 11 | 00 | 10 | 00 | 01 | 11 | 11 | 01 |
| Type | Rise | Maintain | Maintain | Fall | Maintain | Rise | Maintain | Maintain |

FIG. 9

| 3MSB | DL_1 | DL_2 | DL_3 | DL_4 | DL_5 | DL_6 | DL_7 | DL_8 |
|---|---|---|---|---|---|---|---|---|
| DP_K-1 | 010 | 011 | 111 | 100 | 010 | 001 | 100 | 001 |
| DP_K | 111 | 001 | 101 | 001 | 011 | 111 | 111 | 011 |
| Type | Maintain | G1_Fall | G2_Fall | Maintain | Maintain | Maintain | G2_Rise | G1_Rise |

FIG. 12

| 2MSB & 3MSB | DL_1 | DL_2 | DL_3 | DL_4 | DL_5 | DL_6 | DL_7 | DL_8 |
|---|---|---|---|---|---|---|---|---|
| DP_K-1 | 010 | 011 | 111 | 100 | 010 | 001 | 100 | 001 |
| DP_K | 111 | 001 | 101 | 001 | 011 | 111 | 111 | 011 |
| Type | Rise | G1_Fall | G2_Fall | Fall | Maintain | Rise | G2_Rise | G1_Rise |

SOURCE DRIVER, DISPLAY DRIVING CIRCUIT INCLUDING THE SOURCE DRIVER, AND METHOD OF OPERATING THE SOURCE DRIVER

CROSS-REFERENCE TO RELATED APPLICATIONS

This application is a Continuation application of U.S. application Ser. No. 18/437,668, filed on Feb. 9, 2024, which claims priority to Korean Patent Application No. 10-2023-0023790, filed on Feb. 22, 2023, in the Korean Intellectual Property Office, and Korean Patent Application No. 10-2023-0073730, filed on Jun. 8, 2023, in the Korean Intellectual Property Office, the disclosures of which are incorporated by reference herein in their entireties.

BACKGROUND

The present disclosure relates to a source driver performing charge sharing, a display device including the source driver, and a method of operating the source driver.

Display devices are widely used in smartphones, notebook computers, monitors, and the like and include display panels displaying images, and a plurality of pixels are arranged in the display panels. Pixels are driven by data signals that are provided by display driving circuits (for example, display driver integrated circuits (ICs)), thereby implementing images on display panels.

Display driving circuits may provide data signals to display panels on a horizontal line basis. After providing a data signal corresponding to a current horizontal line and before providing a data signal corresponding to the next horizontal line thereto, display driving circuits may perform charge sharing to reduce power consumption. Although power consumption may be reduced by charge sharing when a data signal corresponding to the next horizontal line is provided, there may be unnecessary power consumption in the case where there is a small difference between a current data signal and the next data signal, which each correspond to one data line.

SUMMARY

One or more example embodiments provides a source driver configured to perform charge sharing respectively on a plurality data lines by individually connecting each of the plurality data lines with a charge sharing line, a display driving circuit including the source driver, and a method of operating the source driver.

According to an aspect of an example embodiment, a source driver includes: a switch circuit including a plurality of first switches, which are respectively connected between a first charge sharing line and a plurality of data lines; and a charge sharing controller configured to: receive a plurality of pieces of first pixel data, which respectively correspond to the plurality of data lines, and a plurality of pieces of second pixel data, which respectively correspond to the plurality of pieces of first pixel data; output a charge sharing signal having an active level to a first group of switches among the plurality of first switches respectively connected to first data lines from among the plurality of data lines, based on the plurality of pieces of first pixel data and the plurality of pieces of second pixel data corresponding to the first data lines being different from each other in at least two upper bits thereof.

According to another aspect of an example embodiment, a method of operating a source driver that includes a first charge sharing line capable of being individually connected with each of N data lines, is provided. The method includes: receiving N pieces of first pixel data, which respectively correspond to the N data lines, and N pieces of second pixel data, which respectively correspond to the N pieces of first pixel data; comparing each of the N pieces of second pixel data with a piece of first pixel data corresponding thereto in terms of at least two upper bits thereof; and performing charge sharing by connecting the first charge sharing line with a first group of the N data lines, based on a result of the comparing, wherein N is an integer of 2 or more.

According to another aspect of an example embodiment, a display driving circuit, which provides a data voltage to a display panel via N data lines, is provided. The display driving circuit includes: N first switches respectively connected between a first charge sharing line and the N data lines; N second switches respectively connected between a second charge sharing line and the N data lines; N third switches respectively connected between a third charge sharing line and the N data lines; and a source driver configured to receive N pieces of first pixel data, which respectively correspond to the N data lines, and N pieces of second pixel data, which respectively correspond to the N pieces of first pixel data. The source driver is further configured to output a charge sharing signal having an active level to a first group of the N first switches, a second group of the N second switches, and a third group of the N third switches, which are connected to each of a first group of data lines from among the N data lines, based on each of the first group of data lines corresponding to a piece of the N pieces of the first pixel data and a piece of the N pieces of the second pixel data, which are different from each other in at least two upper bits thereof.

BRIEF DESCRIPTION OF DRAWINGS

The above and other objects and features will be more apparent from the following description of example embodiments, taken in conjunction with the accompanying drawings, in which:

FIG. 5 illustrates a two most significant bits comparison table according to an example embodiment;

FIG. 6 illustrates the types of pieces of pixel data, to which a two most significant bits comparison table is applied, according to an example embodiment;

FIG. 9 illustrates types of pieces of pixel data, to which a three most significant bits comparison table is applied, according to an example embodiment;

FIG. 12 illustrates the types of pieces of pixel data, to which a most significant bit comparison table is applied, according to an example embodiment;

DETAILED DESCRIPTION

Hereinafter, various example embodiments are described with the accompanying drawings. Embodiments described herein are example embodiments, and thus, the present disclosure is not limited thereto, and may be realized in various other forms. Each example embodiment provided in the following description is not excluded from being associated with one or more features of another example or another example embodiment also provided herein or not provided herein but consistent with the present disclosure. It will be understood that when an element or layer is referred to as being "on," "connected to" or "coupled to" another element or layer, it can be directly on, connected or coupled to the other element or layer, or intervening elements or layers may be present. By contrast, when an element is referred to as being "directly on," "directly connected to" or "directly coupled to" another element or layer, there are no intervening elements or layers present. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c. It will be also understood that, even if a certain step or operation of manufacturing an apparatus or structure is described later than another step or operation, the step or operation may be performed later than the other step or operation unless the other step or operation is described as being performed after the step or operation.

Figure 1:
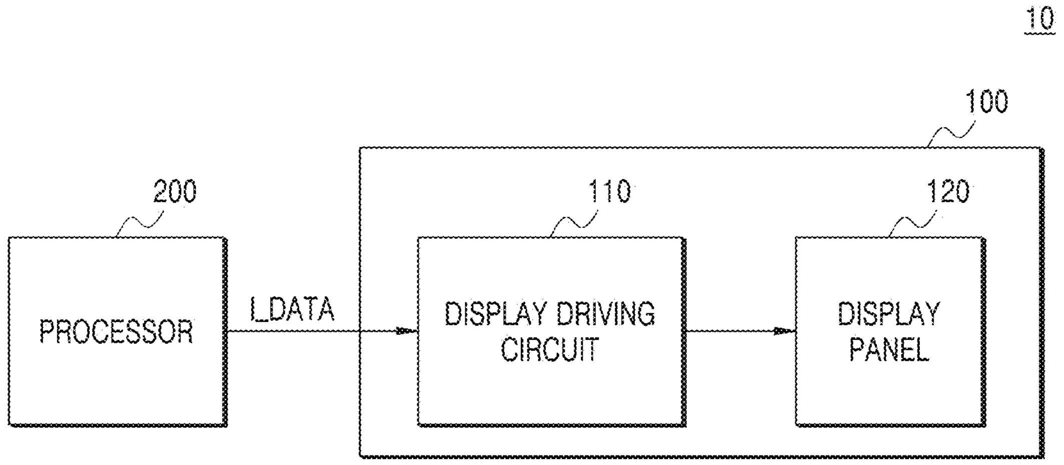
FIG. 1 is a block diagram illustrating a display device and a display system including the display device, according to an example embodiment.

FIG. 1 is a block diagram illustrating a display device and a display system including the display device, according to an example embodiment.

A display system 10 according to an example embodiment may be mounted on an electronic device having an image display function. For example, the electronic device may include a smartphone, a tablet personal computer (PC), a portable multimedia player (PMP), a camera, a wearable device, a television, a digital video disk (DVD) player, a refrigerator, an air conditioner, an air purifier, a set-top box, a robot, a drone, various medical devices, a navigation device, a global positioning system (GPS) receiver, an automotive device, furniture, various measurement devices, or the like.

Referring to FIG. 1, the display system 10 may include a display device 100 and a processor 200. The display device 100 may include a display driving circuit 110 and a display panel 120.

The processor 200 may generate image data I_DATA, which is to be displayed on the display panel 120, and may output the image data I_DATA to the display driving circuit 110. The processor 200 may include a graphics processor. However, the processor 200 is not limited thereto, and the processor 200 may be implemented by various types of processors, such as a central processing unit (CPU), a microprocessor, a multimedia processor, and an application processor. In an example embodiment, the processor 200 may be implemented by an integrated circuit (IC) or a system-on-chip (SoC).

The display device 100 may display the image data I_DATA that is received from the processor 200. In an example embodiment, the display device 100 may include a device in which the display driving circuit 110 and the display panel 120 are implemented to be one module. For example, the display driving circuit 110 may be mounted on a substrate of the display panel 120, or the display driving circuit 110 and the display panel 120 may be electrically connected to each other via a connection member, such as a flexible printed circuit board or the like.

The display panel 120 corresponds to a display, on which an actual image is displayed, and may include one of display devices receiving electrically transferred image signals and displaying 2-dimensional images, such as an organic light-emitting diode (OLED) display, a thin film transistor-liquid crystal display (TFT-LCD), a field-emission display, a plasma display panel (PDP), and the like. Hereinafter, the display panel 120 is described as an OLED display panel in which pixels each include an OLED. However, example embodiments are not limited thereto, and the display panel 120 may be implemented by another type of flat display panel or a flexible display panel.

The display driving circuit 110 may convert the image data I_DATA, which is received from the processor 200, into a plurality of analog signals, for example, a plurality of data voltages, for driving the display panel 120 and may provide the converted plurality of analog signals (or data voltages) to the display panel 120. Therefore, an image corresponding to the image data I_DATA may be displayed on the display panel 120.

The display driving circuit 110 according to example embodiments may provide a data voltage to the display panel 120 on the basis of one horizontal line. The display driving circuit 110 may perform charge sharing by comparing two pieces of pixel data, which correspond to one data line and consecutive gate lines, with each other in terms of at least two upper bits thereof. Charge sharing and a method of performing charge sharing according to example embodiments are described below.

Figure 2:
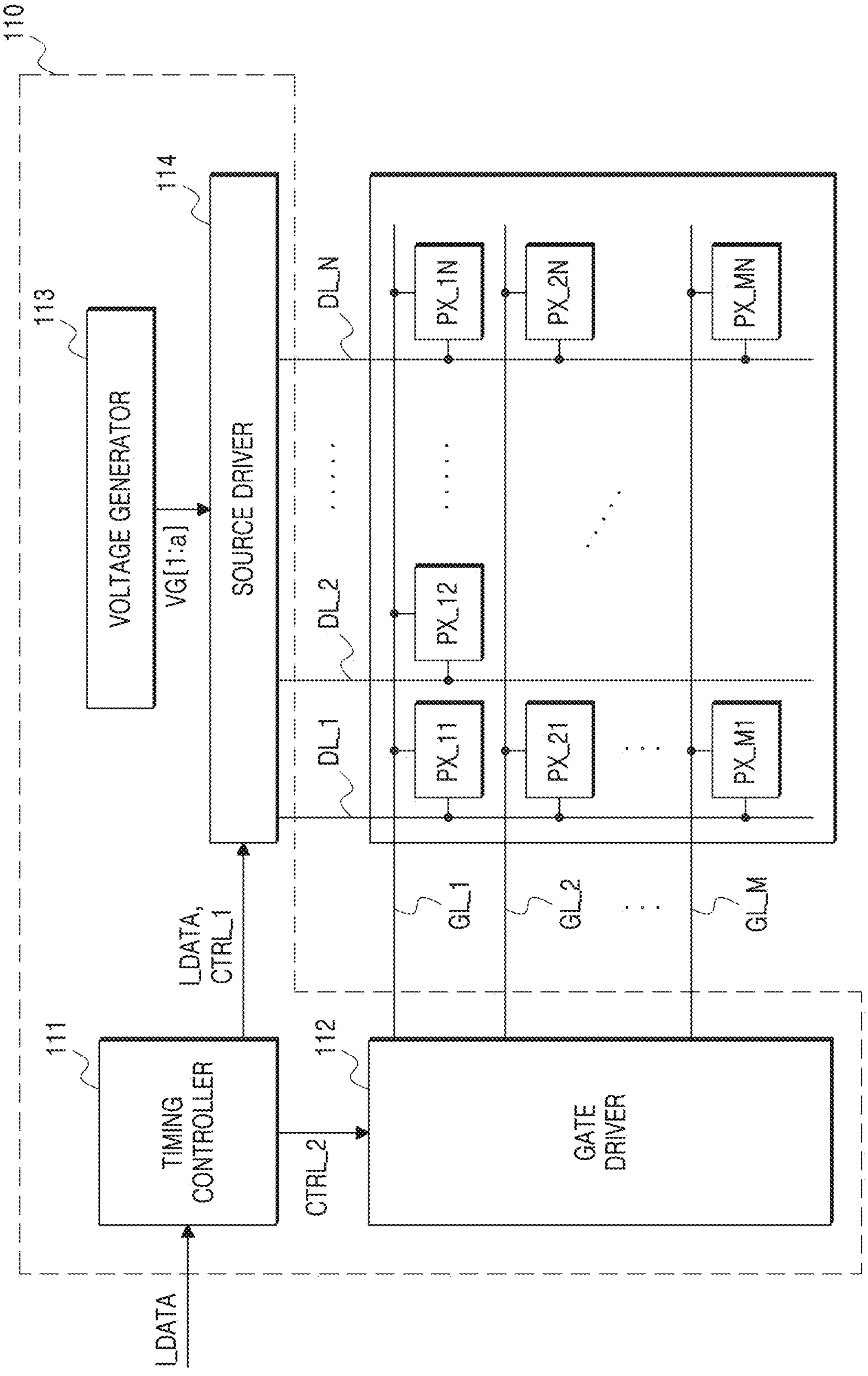
FIG. 2 is a block diagram illustrating a display driving circuit and a display panel, according to an example embodiment.

FIG. 2 is a block diagram illustrating a display driving circuit and a display panel, according to an example embodiment.

Referring to FIG. 2, the display panel 120 may include a plurality of gate lines GL_1 to GL_M, a plurality of data lines DL_1 to DL_N arranged to cross the plurality of gate lines GL_1 to GL_M, and a plurality of pixels PX_11 to PX_MN. Here, N and M are each an integer of 2 or more and the same applies to the following description.

In an example embodiment, the plurality of pixels PX_11 to PX_MN may be arranged in a plurality of rows and a plurality of columns. For example, the plurality of pixels PX_11 to PX_MN may be arranged in M rows and N columns. The plurality of pixels PX_11 to PX_MN may be operated based on signals received via M gate lines GL_1 to GL_M, which respectively correspond to the M rows, and N data lines DL_1 to DL_N, which respectively correspond to the N columns.

For example, when the display panel 120 includes an OLED display, each of the plurality of pixels PX_11 to PX_MN may include a switching transistor, a storage capacitor, a drive transistor, and an OLED. When one gate line (for example, GL_1) is selected from the plurality of gate lines GL_1 to GL_M by a gate driver 112, that is, when a gate signal is applied via a gate line (for example, GL_1), the switching transistor in each of the pixels (for example, PX_11 to PX_1N) connected to the selected gate line (for example, GL_1) may be turned on. When the switching transistor is turned on, a data voltage received via a data line connected with one end of the switching transistor may be stored in the storage capacitor connected with the other end of the switching transistor. The drive transistor may be turned on or turned off depending on a voltage stored in the storage capacitor. The OLED may emit light while the drive transistor is turned on, and thus, an image may be displayed on the display panel 120. However, the display panel 120 according to example embodiments is not limited thereto. For example, the display panel 120 may include an LCD and each of the plurality of pixels PX_11 to PX_MN may include an LCD pixel including a liquid crystal capacitor.

The display panel 120 includes a plurality of rows (or horizontal lines), and one horizontal line includes a plurality of pixels connected to one gate line. For example, a first horizontal line may include the pixels PX_11 to PX_1N in a first row, which are connected to a first gate line (that is, GL_1), and a second horizontal line may include the pixels PX_21 to PX_2N in a second row, which are connected to a second gate line (that is, GL_2). Because the first horizontal line is adjacent to the second horizontal line in a column direction, the first horizontal line and the second horizontal line may be referred to as two consecutive horizontal lines.

Horizontal line time may refer to a period of time for which pixels in one horizontal line are driven. During the horizontal line time, a plurality of pixels in one horizontal line may be driven, and during the next horizontal line time, a plurality of pixels in another horizontal line may be driven. For example, during a first horizontal line time, the pixels PX_11 to PX_1N in the first horizontal line corresponding to the first gate line (that is, GL_1) may be driven, and during a second horizontal line time following the first horizontal line time, the pixels PX_21 to PX_2N in the second horizontal line corresponding to the second gate line (that is, GL_2) may be driven. Similarly, from the first horizontal line time until the $M^{-th}$ horizontal line time, a plurality of pixels, which are included in the first horizontal line to the $M^{-th}$ horizontal line, may each be driven sequentially, and thus, an image may be displayed on the display panel 120.

Referring to FIG. 2, the display driving circuit 110 may include a timing controller 111, a gate driver 112, a voltage generator 113, and a source driver 114.

In an example embodiment, the timing controller 111, the gate driver 112, the voltage generator 113, and the source driver 114 may be integrated into one semiconductor chip.

The display driving circuit 110 may receive the image data I_DATA from an external source (for example, the processor 200 of FIG. 1), may convert the image data I_DATA into a plurality of analog signals, for example, a plurality of data voltages, and may respectively provide the plurality of analog signals (or data voltages) to the pixels PX_11 to PX_NM via the plurality of data lines DL_1 to DL_N. Specifically, as described above, the display driving circuit 110 may provide, to each of the pixels (for example, PX_11 to PX_1N) in one horizontal line via the plurality of data lines DL_1 to DL_N, a data voltage corresponding thereto.

The timing controller 111 may control all operations of the display driving circuit 110. For example, the timing controller 111 may receive the image data I_DATA from an external source (for example, the processor 200 of FIG. 1) and may control other components of the display driving circuit 110, for example, the gate driver 112 and the source driver 114, such that an image based on the image data I_DATA is displayed on the display panel 120. Specifically, the timing controller 111 may receive the image data I_DATA and may output the image data I_DATA to the source driver 114. Here, the image data I_DATA, which is output to the source driver 114 by the timing controller 111, may be data that is converted in terms of format from the image data I_DATA received by the timing controller 111 to be suitable for specifications of an interface between the timing controller 111 and the source driver 114.

The timing controller 111 may generate control signals for controlling timings of the source driver 114 and the gate driver 112. Specifically, the timing controller 111 may generate a first control signal CTRL_1 to control an operation timing of the source driver 114 and may output the first control signal CTRL_1 to the source driver 114. In addition, the timing controller 111 may generate a second control signal CTRL_2 to control an operation timing of the gate driver 112 and may output the second control signal CTRL_2 to the gate driver 112.

The source driver 114 may receive the first control signal CTRL_1 and the image data I_DATA, which is a digital signal, from the timing controller 111 and may convert the image data I_DATA into an analog signal, for example, a data voltage, based on the first control signal CTRL_1.

The first control signal CTRL_1 according to example embodiments may refer to at least one signal that is output by the timing controller 111 to control the operation of the source driver 114. For example, the first control signal CTRL_1 may include a signal that is output to the source driver 114 by the timing controller 111 to control a timing of outputting a data packet (for example, DP_K in FIG. 3) of a latch circuit (for example, 310 in FIG. 3) of the source driver 114, a signal for controlling a timing for a charge sharing controller (for example, 340*a* in FIG. 3) of the source driver 114 to compare pieces of pixel data, which are respectively included in two consecutive data packets (for example, DP_K−1 and DP_K in FIG. 3), with each other and thus output a charge sharing signal (for example, CS_1 to CS_N in FIG. 3), a signal for controlling a timing for a digital-to-analog conversion circuit (for example, 320 in FIG. 3) to respectively output a plurality of data voltages (for example, Y_1 to Y_N in FIG. 3) to a plurality of data lines (for example, DL_1 to DL_N), and the like. It will be understood that the first control signal CTRL_1 is not limited to the examples set forth above and includes all signals that are output by the timing controller 111 to control operations of the source driver 114 according to example embodiments.

The source driver 114 may receive a plurality of pieces of pixel data in the image data I_DATA from the timing controller 111 on a horizontal line basis. For example, the source driver 114 may receive, from the timing controller 111, pieces of pixel data, which respectively correspond to a plurality of pixels (for example, PX_11 to PX_1N) in one horizontal line, as one unit. The source driver 114 may convert each of the pieces of pixel data received on a horizontal line basis into a data voltage, based on a gray-scale voltage VG[1:a] generated by the voltage generator 113. The source driver 114 may output, to the display panel 120, a plurality of data voltages, which respectively correspond to the plurality of data lines DL_1 to DL_N, on a horizontal line basis via the plurality of data lines DL_1 to DL_N. For example, the source driver 114 may output data voltages, which respectively correspond to the plurality of pixels PX_11 to PX_1N connected to the first gate line GL_1, to the display panel 120, and then, may output data voltages, which respectively correspond to a plurality of pixels PX_21 to PX_2N connected to the second gate line GL_2, to the display panel 120.

The image data I_DATA according to example embodiments may include data packets in the same number as the number of horizontal lines of the display panel 120. Here, one data packet may include a plurality of pieces of pixel data respectively corresponding to a plurality of pixels, which are included in a horizontal line corresponding to the one data packet. For example, the image data I_DATA may include first to $M^{th}$ data packets, which are the same in number as the horizontal lines (M horizontal lines) of the display panel 120. Each of the M data packets may include pieces of pixel data respectively corresponding to a plurality of pixels, which are included in a horizontal line corresponding thereto. Therefore, a first data packet may include a plurality of pieces of pixel data respectively corresponding to the pixels PX_11 to PX_1N, which are included in a first horizontal line (corresponding to the first gate line (that is, GL_1)). Similarly, a second data packet may include a plurality of pieces of pixel data respectively corresponding to the pixels PX_21 to PX_2N, which are included in a second horizontal line (corresponding to the second gate line (that is, GL_2)).

The source driver 114 may compare two pieces of pixel data respectively corresponding to two pixels, which are included respectively in two consecutive horizontal lines and connected to the same data line. The source driver 114 may compare the two pieces of data with each other in terms of at least two upper bits thereof and may determine whether to perform charge sharing on the data line connected to the two pixels, based on a comparison result. For example, the source driver 114 may determine whether to perform charge sharing on the first data line (that is, DL_1) by comparing two pieces of pixel data respectively corresponding to two pixels PX_11 and PX_21, which are connected with the first data line (that is, DL_1), from among a plurality of pixels respectively connected to the first gate line (that is, GL_1) and the second gate line (that is, GL_2). The source driver 114 may compare at least two upper bits of a first pixel data corresponding to a first pixel (that is, PX_11) with at least two upper bits of a second pixel data corresponding to a second pixel (that is, PX_21). Herein, the two pieces of pixel data may also be expressed as two pieces of pixel data, which are included respectively in two consecutive data packets and correspond to one data line.

The voltage generator 113 may generate voltages that are necessary to drive the display device 100 (see FIG. 1). For example, the voltage generator 113 may receive a power supply voltage from outside the display device 100 (see FIG. 1) and generate gray-scale voltages VG[1:a]. The voltage generator 113 may generate a gray-scale voltage VG[1:a] and output the gray-scale voltage VG[1:a] to the source driver 114. The source driver 114 may generate a plurality of data voltages based on the gray-scale voltage VG[1:a] received from the voltage generator 113 and the image data I_DATA received from the timing controller 111. The generation of the plurality of data voltages is described below in more detail with reference to a digital-to-analog conversion circuit 320 of FIG. 4.

The gate driver 112 may be connected with the plurality of pixels PX_11 to PX_MN of the display panel 120 via the plurality of gate lines GL_1 to GL_M and may sequentially drive each of the plurality of gate lines GL_1 to GL_M. Specifically, the gate driver 112 may receive the second control signal CTRL_2 from the timing controller 111 and may respectively and sequentially output a plurality of gate signals having an active level (or logic high) to the plurality of gate lines GL_1 to GL_M. Therefore, the plurality of gate lines GL_1 to GL_M may be sequentially selected, and a plurality of data voltages may be respectively applied to pixels (for example, PX_11 to PX_1N) connected with a selected gate line (for example, GL_1) via the plurality of data lines DL_1 to DL_N.

The display driving circuit 110 may further include a memory, and the memory may store the image data I_DATA on a frame basis and may output the image data I_DATA on a frame basis according to a request from the timing controller 111. However, example embodiments are not limited thereto.

Figure 3:
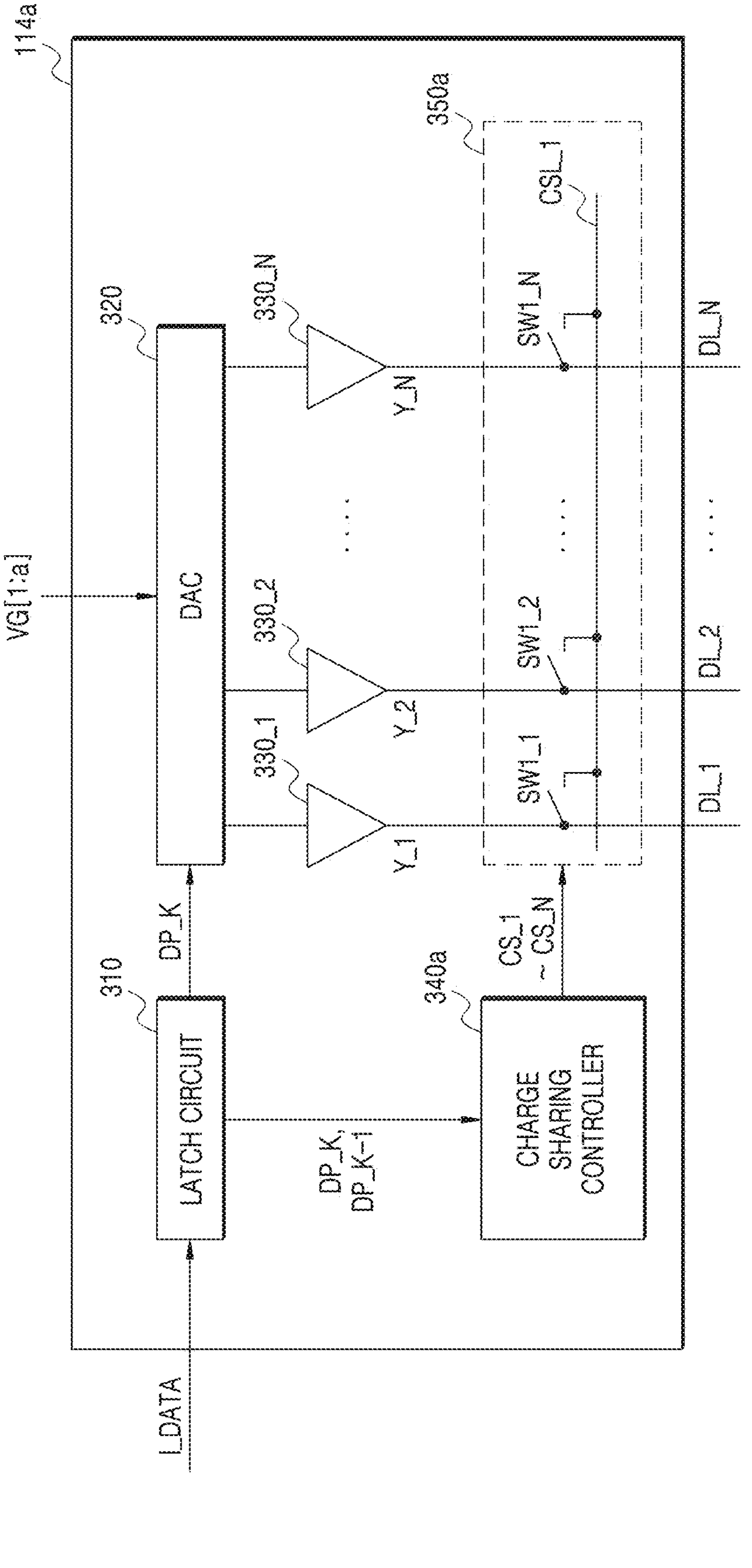
FIG. 3 is a block diagram illustrating a source driver according to an example embodiment.

FIG. 3 is a block diagram illustrating a source driver according to an example embodiment. Descriptions regarding FIG. 3 may be made with reference to FIG. 2. In addition, a source driver 114*a* of FIG. 3 may correspond to the source driver 114 of FIG. 2, and repeated descriptions may be omitted.

Referring to FIG. 3, the source driver 114*a* may include a latch circuit 310, a digital-to-analog conversion circuit (DAC) 320, a plurality of buffers 330_1 to 330_N, a charge sharing controller 340*a*, and a switch circuit 350*a*. The source driver 114*a* may be implemented by one semiconductor chip. Alternatively, the function of the source driver 114*a* may be implemented in a semiconductor device, such as an SoC or the like.

The source driver 114*a* may include N channels respectively in correspondence with N data lines DL_1 to DL_N and may output a plurality of data voltages Y_1 to Y_N for driving the display panel 120 (see FIG. 2) to the display panel 120 (see FIG. 2) via the N channels. Each of the plurality of data voltages Y_1 to Y_N is a signal provided to drive pixels connected with one gate line, and the display panel 120 (see FIG. 2) may display one frame by receiving the data voltages Y_1 to Y_N respectively corresponding to the M gate lines GL_1 to GL_M (see FIG. 2).

Although the N data lines DL_1 to DL_N of FIG. 3 are shown as respectively corresponding to the N buffers 330_1 to 330_N for convenience of description, example embodiments are not limited thereto, and data lines may be included in the display panel 120 (see FIG. 2). It should be understood that this is also applied likewise below.

The latch circuit 310 may receive and latch the image data I_DATA. As described above, the source driver 114*a* may receive pixel data of the image data I_DATA from the timing controller 111 (see FIG. 2) on a horizontal line basis. The latch circuit 310 may receive the pixel data of the image data I_DATA on a horizontal line basis and may output a data packet including pixel data corresponding to a horizontal line. As described above, the data packet may include pieces of pixel data, which respectively correspond to a plurality of pixels in one horizontal line. For example, the latch circuit 310 may output a $K-1^{-th}$ data packet DP_K-1 including N pieces of pixel data, which respectively correspond to a plurality of pixels, that is, N pixels, connected to a $K-1^{-th}$ gate line, and similarly, may output a $K^{-th}$ data packet DP_K including pieces of pixel data, which respectively correspond to a plurality of pixels, that is, N pixels, connected to a Kth gate line. K is an integer of 2 to M.

The latch circuit 310 may output two data packets respectively corresponding to two consecutive horizontal lines to the charge sharing controller 340*a* and may output a data packet, which corresponds to a selected gate line, out of the two data packets to the digital-to-analog conversion circuit 320. The data packet other than the data packet corresponding to the selected gate line, out of the two data packets, may be a data packet corresponding to a gate line selected earlier than the selected gate line (i.e., a previously selected gate line). For example, the latch circuit 310 may output the $K-1^{-th}$ data packet DP_K-1 and the $K^{-th}$ data packet DP_K respectively corresponding to a $K-1^{-th}$ horizontal line and a $K^{-th}$ horizontal line, which are consecutive to each other, to the charge sharing controller 340*a* and may output the $K^{-th}$ data packet DP_K, which corresponds to a currently selected gate line (that is, the $K^{-th}$ gate line), to the digital-to-analog conversion circuit 320.

The digital-to-analog conversion circuit 320 may receive a data packet, which includes a plurality of pieces of pixel data, and gray-scale voltages VG[1:a] and may convert each of the pieces of pixel data into a data voltage, based on the gray-scale voltages VG[1:a]. For example, the digital-to-analog conversion circuit 320 may receive the $K^{-th}$ data packet DP_K including a plurality of pieces of pixel data, which respectively correspond to a plurality of pixels connected to the $K^{-th}$ gate line, and may output, as data voltages, voltages respectively corresponding to the plurality of pieces of pixel data of the $K^{-th}$ data packet DP_K from among the gray-scale voltages VG[1:a]. For example, when pieces of pixel data D1 to Dm each include I bits and a plurality of gray-scale voltages VG[1:a] include $2^I$(=a) voltages, the digital-to-analog conversion circuit 320 may select one voltage corresponding to a piece of pixel data including I bits and output the one voltage as a data voltage.

The digital-to-analog conversion circuit 320 may output the data voltages Y_1 to Y_N to the plurality of data lines DL_1 to DL_N through the plurality of buffers 330_1 to 330_N, respectively. The plurality of buffers 330_1 to 330_N, which respectively correspond to N channels, may respectively receive and buffer the data voltages Y_1 to Y_N corresponding thereto and may respectively output the data voltages Y_1 to Y_N to the plurality of data lines DL_1 to DL_N corresponding thereto.

As described above, the charge sharing controller 340*a* may receive two consecutive data packets from the latch circuit 310. For example, the charge sharing controller 340*a* may receive, from the latch circuit 310, the $K-1^{-th}$ data packet DP_K-1 and the $K^{-th}$ data packet DP_K, which respectively correspond to the $K-1^{-th}$ horizontal line and the $K^{-th}$ horizontal line that are consecutive to each other.

The charge sharing controller 340*a* according to example embodiments may respectively output charge sharing signals CS_1 to CS_N to first switches SW1_1 to SW1_N described below and respectively connected to the plurality of data lines DL_1 to DL_N. The reference numerals "CS_1 to CS_N" used herein are representations for distinguishing charge sharing signals based on data lines. For example, the charge sharing controller 340*a* may output the charge sharing signal CS_1 to the first switch SW1_1 connected with the first data line (that is, DL_1) corresponding to the charge sharing signal CS_1, may output the charge sharing signal CS_2 to the first switch SW1_2 connected with the second data line (that is, DL_2) corresponding to the charge sharing signal CS_2, and may output the charge sharing signal CS_N to the first switch SW1_N connected with the N-th data line (that is, DL_N) corresponding to the charge sharing signal CS_N.

As described above, the charge sharing controller 340*a* may receive two consecutive data packets (that is, DP_K-1 and DP_K) and may compare two pieces of pixel data with each other, the two pieces of pixel data being respectively included in the two consecutive data packets (that is, DP_K-1 and DP_K) and corresponding to the same data line. The charge sharing controller 340*a* may be configured to output the charge sharing signals CS_1 to CS_N to the switch circuit 350*a*, based on a comparison result.

For example, referring to FIG. 4 described below, the charge sharing controller 340*a* may receive the $K-1^{-th}$ data packet DP_K-1 (see FIG. 4) and the $K^{-th}$ data packet DP_K (see FIG. 4) and may output the charge sharing signal CS_1 to the first switch SW1_1 by comparing a piece of first pixel data D1_1 (see FIG. 4), which corresponds to the first data line (that is, DL_1) from among pieces of first pixel data D1_1 to D1_8 (see FIG. 4) of the $K-1^{-th}$ data packet DP_K-1 (see FIG. 4), with a piece of second pixel data D2_1 (see FIG. 4), which corresponds to the first data line (that is, DL_1) from among pieces of second pixel data D2_1 to D2_8 (see FIG. 4) of the $K^{-th}$ data packet DP_K (see FIG. 4). Although two pieces of pixel data corresponding to the first data line (that is, DL_1) are described in the example set forth above, the charge sharing controller 340*a* may output a charge sharing signal by comparing two pieces of pixel data corresponding to each of the remaining data lines, similar to the example set forth above.

The switch circuit 350*a* may include a plurality of first switches SW1_1 to SW1_N respectively connected between a first charge sharing line CSL_1 and the plurality of data lines DL_1 to DL_N. For example, the first switch SW1_1 may be connected between the first data line (that is, DL_1) and the first charge sharing line CSL_1, the first switch SW1_2 may be connected between the second data line (that is, DL_2) and the first charge sharing line CSL_1, and the first switch SW1_N may be connected between the N-th data line (that is, DL_N) and the first charge sharing line CSL_1.

Referring to FIG. 3, although the switch circuit 350*a* and the first charge sharing line CSL_1 are included in the source driver 114*a*, a switch circuit and at least one charge sharing line, example embodiments are not limited thereto, and these components may be located outside a source driver. When a switch circuit is located outside a source driver, the source driver may output a charge sharing signal to the switch circuit that is outside the source driver, and the switch circuit outside the source driver may operate in the same manner as described above based on the charge sharing signal.

The first switches SW1_1 to SW1_N according to example embodiments may be turned on in response to the charge sharing signals CS_1 to CS_N corresponding thereto at an active level, respectively. For example, when the first switches SW1_1, SW1_2, and SW1_N are turned on in response to the charge sharing signals CS_1, CS_2, and CS_N at an active level, respectively, the data lines DL_1, DL_2, and DL_N respectively connected with the first switches SW1_1, SW1_2, and SW1_N may be connected to each other via the first charge sharing line CSL_1. Therefore, the first data line (that is, DL_1), the second data line (that is, DL_2), and the $N^{-th}$ data line (that is, DL_N) are connected to each other and thus share charges, whereby charge sharing may be performed to the same voltage.

As described above, the source driver 114*a* may output the data voltages Y_1 to Y_N to the display panel 120 (see FIG. 2) on a horizontal line basis via the plurality of data lines DL_1 to DL_N. The source driver 114*a* may provide the data voltages Y_1 to Y_N corresponding to one horizontal line to the display panel 120 (see FIG. 2) via the plurality of data lines DL_1 to DL_N, and then, may provide the data voltages Y_1 to Y_N corresponding to the next horizontal line to the display panel 120 (see FIG. 2) via the plurality of data lines DL_1 to DL_N. Here, charges respectively corresponding to a plurality of data voltages Y_1 to Y_N, which correspond to the one horizontal line, may be respectively stored in parasitic capacitors, which are respectively present in the plurality of data lines DL_1 to DL_N. Here, a parasitic capacitor may refer to parasitic capacitors due to an output pad and the like of a display driving circuit as well as a data line itself. Therefore, each of the plurality of data lines DL_1 to DL_N may have a voltage based on a data voltage corresponding thereto due to the parasitic capacitor. Before providing data voltages corresponding to the next horizontal line to the display panel 120 (see FIG. 2), the source driver 114*a* may individually connect each of the plurality of data lines DL_1 to DL_N to each other by comparing two pieces of pixel data, which are consecutive to each other and correspond to each of the plurality of data lines DL_1 to DL_N. Therefore, the source driver 114*a* may perform charge sharing on data lines connected to each other by sharing charges stored in the parasitic capacitor of each of the data lines connected to each other.

Figure 4:
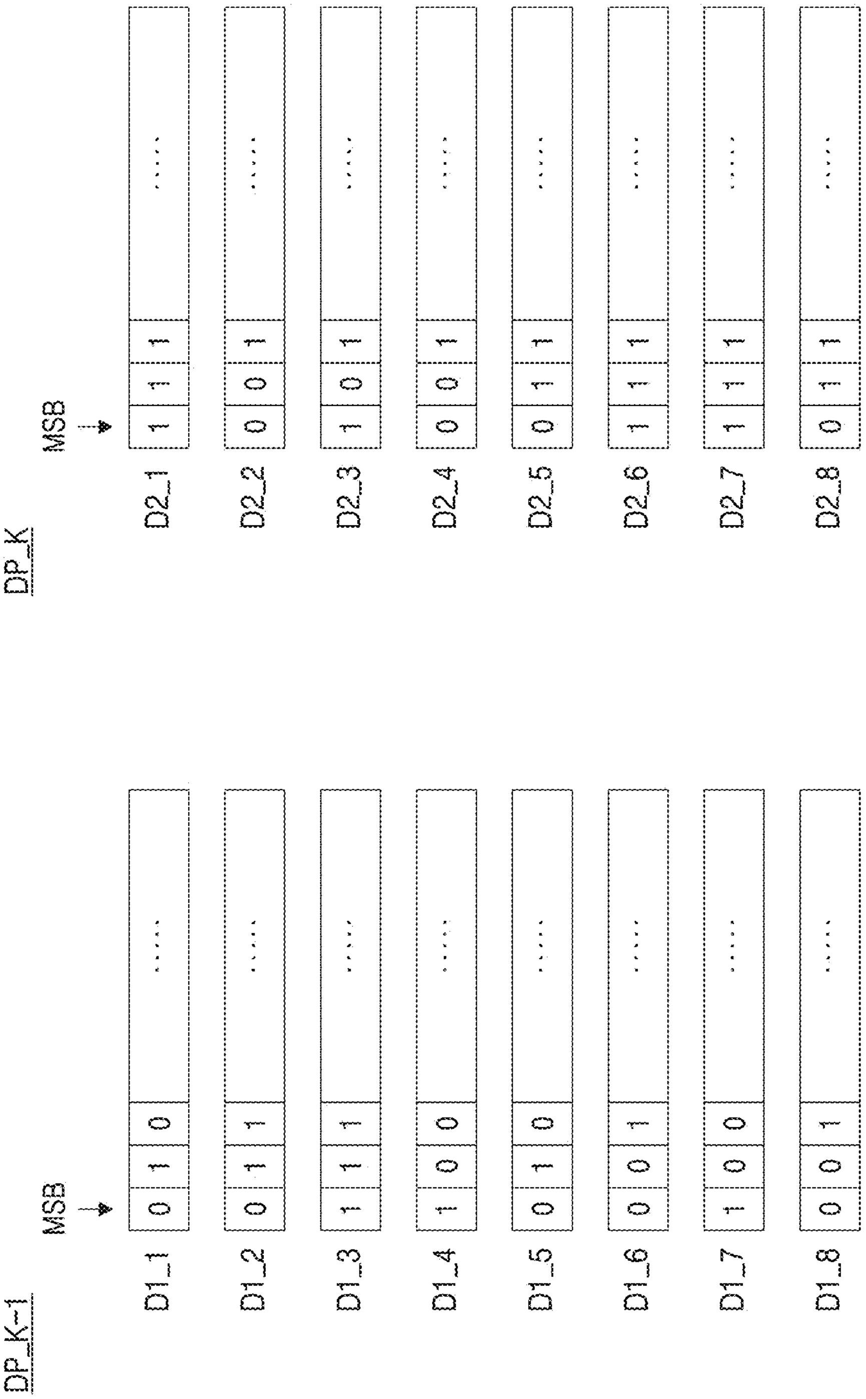
FIG. 4 illustrates two consecutive data packets according to an example embodiment.

FIG. 4 illustrates two consecutive data packets according to an example embodiment.

Referring to FIG. 4, the $K-1^{-th}$ data packet DP_K−1 corresponding to the $K-1^{-th}$ horizontal line and the Kth data packet DP_K corresponding to the Kth horizontal line, which is a horizontal line next to the $K-1^{-th}$ horizontal line, are illustrated. Specifically, the $K-1^{-th}$ data packet DP_K−1 may include pieces of first pixel data D1_1 to D1_8 respectively corresponding to a plurality of pixels connected with the $K-1^{-th}$ gate line, and the $K^{-th}$ data packet DP_K may include pieces of second pixel data D2_1 to D2_8 respectively corresponding to a plurality of pixels connected with the $K^{-th}$ gate line. For example, when K is 2 and the number of data lines is 8, a first data packet may include the pieces of first pixel data D1_1 to D1_8 respectively corresponding to 8 pixels connected with a first gate line, and a second data packet may include the pieces of second pixel data D2_1 to D2_8 respectively corresponding to 8 pixels connected with a second gate line.

Herein, the terms "first pixel data" and "second pixel data" are used to indicate that the first pixel data and the second pixel data are included in different data packets from each other, and are also used in the following description to distinctively indicate pieces of pixel data that are included in each of two consecutive data packets. Therefore, the pieces of first pixel data do not always refer to pieces of pixel data respectively corresponding to a plurality of pixels connected to a first gate line, and this is the same for the pieces of second pixel data.

As described above, a data packet may include pieces of pixel data respectively corresponding to the N data lines DL_1 to DL_N (see FIG. 3). In the following description, it is assumed that there are 8 data lines for convenience of description. Therefore, the following description is made under the assumption that each of the $K-1^{-th}$ data packet DP_K−1 and the $K^{-th}$ data packet DP_K, which correspond to two consecutive data packets, includes 8 pieces of pixel data. However, the number of data lines, and the number of pieces of pixel data in a data packet are not limited thereto.

In addition, although the following example embodiments are described based on the $K-1^{-th}$ data packet DP_K−1 and the $K^{-th}$ data packet DP_K of FIG. 4 for convenience of description, example embodiments are not limited thereto.

Pieces of pixel data according to example embodiments may each include at least two bits, and the uppermost bit therein may be referred to as the most significant bit (MSB). For example, referring to FIG. 4, the MSB of the piece of first pixel data D1_1, which is included in the $K-1^{-th}$ data packet DP_K−1 and corresponds to a first data line, may be 0, and the MSB of the piece of first pixel data D1_2, which is included in the $K-1^{-th}$ data packet DP_K−1 and corresponds to a second data line, may be 0. Similarly, the MSB of the piece of second pixel data D2_1, which is included in the $K^{-th}$ data packet DP_K and corresponds to the first data line, may be 1, and the MSB of the piece of second pixel data D2_2, which is included in the $K^{-th}$ data packet DP_K and corresponds to the second data line, may be 0.

Herein, upper two bits in a piece of pixel data may be referred to as 2MSB (i.e., the two most significant bits). For example, referring to FIG. 4, the two most significant bits of the piece of first pixel data D1_1, which is included in the $K-1^{-th}$ data packet DP_K−1 and corresponds to the first data line, may be 01, and the two most significant bits of the piece of first pixel data D1_2, which is included in the $K-1^{-th}$ data packet DP_K−1 and corresponds to the second data line, may be 01. Similarly, the two most significant bits of the piece of second pixel data D2_1, which is included in the $K^{-th}$ data packet DP_K and corresponds to the first data line, may be 11, and the two most significant bits of the piece of second pixel data D2_2, which is included in the $K^{-th}$ data packet DP_K and corresponds to the second data line, may be 00. Similarly, upper three bits in a piece of pixel data may be referred to as three most significant bits (3MSB).

The source driver 114 (see FIG. 2) may perform charge sharing by comparing two pieces of pixel data with each other in terms of at least two upper bits thereof, the two pieces of pixel data corresponding to the same data line from among pieces of pixel data, which are included in each of two consecutive data packets.

FIG. 5 illustrates a two most significant bits comparison table according to an example embodiment.

Referring to FIG. 5, 2MSB_K−1 refers to the two most significant bits of a piece of pixel data that is included in a $K-1^{-th}$ data packet, and 2MSB_K refers to the two most significant bits of a piece of pixel data that is included in a Kth data packet. When a difference between 2MSB_K−1 and 2MSB_K is 2 or more, the type of the piece of pixel data in the $K^{-th}$ data packet may correspond to "rise" or "fall", and when the difference therebetween is less than 2, the type of the piece of pixel data in the Kth data packet may correspond to "maintain". Specifically, when 2MSB_K is greater than 2MSB_K−1 by 2 or more, the type of the piece of pixel data may correspond to "rise", and when 2MSB_K is less than 2MSB_K−1 by 2 or more, the type of the piece of pixel data may correspond to "fall".

Therefore, the charge sharing controller 340*a* (see FIG. 3) may determine the type of each of the plurality of pieces of pixel data of the Kth data packet by comparing the two most significant bits of each of the plurality of pieces of pixel data of the $K-1^{-th}$ data packet, which corresponds to a previous horizontal line, with the two most significant bits of each of the plurality of pieces of pixel data of the $K^{-th}$ data packet, which corresponds to a current horizontal line.

In addition, a charge sharing controller 340*b* (see FIG. 8) and a charge sharing controller 340*c* (see FIG. 11) may each determine the type of each of the plurality of pieces of pixel data of the Kth data packet by comparing the three most significant bits (3MSB) of each of the plurality of pieces of pixel data of the $K-1^{-th}$ data packet, which corresponds to a previous horizontal line, with the three most significant bits of each of the plurality of pieces of pixel data of the $K^{-th}$ data packet, which corresponds to a current horizontal line. This is described below in detail.

FIG. 6 illustrates the types of pieces of pixel data, to which a two most significant bits comparison table is applied, according to an example embodiment.

Descriptions regarding FIG. 6 may be made with reference to FIGS. 4 and 5. Specifically, FIG. 6 illustrates a result of applying the two most significant bits comparison table to the pieces of first pixel data D1_1 to D1_8, which are included in the $K-1^{-th}$ data packet DP_K−1 of FIG. 4 and respectively correspond to first to eighth data lines (that is, DL_1 to DL_8), and the pieces of second pixel data D2_1 to D2_8, which are included in the $K^{-th}$ data packet DP_K and respectively correspond to the first to eighth data lines (that is, DL_1 to DL_8).

Referring to FIG. 4, the respective two most significant bits of the pieces of first pixel data D1_1 to D1_8 (see FIG. 4) of the $K-1^{-th}$ data packet DP_K−1 are 01, 01, 11, 10, 01, 00, 10, and 00 in the stated order, and the respective two most significant bits of the pieces of second pixel data D2_1 to D2_8 (see FIG. 4) of the $K^{-th}$ data packet DP_K are 11, 00, 10, 00, 01, 11, 11, and 01 in the stated order. When the two most significant bits comparison table of FIG. 5 is applied to the two most significant bits of each of the pieces of first pixel data D1_1 to D1_8 (see FIG. 4) of the $K-1^{-th}$ data packet DP_K−1 and the two most significant bits of each of the pieces of second pixel data D2_1 to D2_8 (see FIG. 4) of the $K^{-th}$ data packet DP_K, that is, when a piece of first pixel data and a piece of second pixel data, which correspond to each other, are compared with each other in terms of the two most significant bits thereof, the respective types of the pieces of second pixel data D2_1 to D2_8 (see FIG. 4) of the Kth data packet DP_K are the same as shown in FIG. 6.

The number of pieces of pixel data and the respective two most significant bits of the pieces of pixel data, as described above, are only examples for better understanding, and example embodiments are not limited thereto.

Figure 7A:
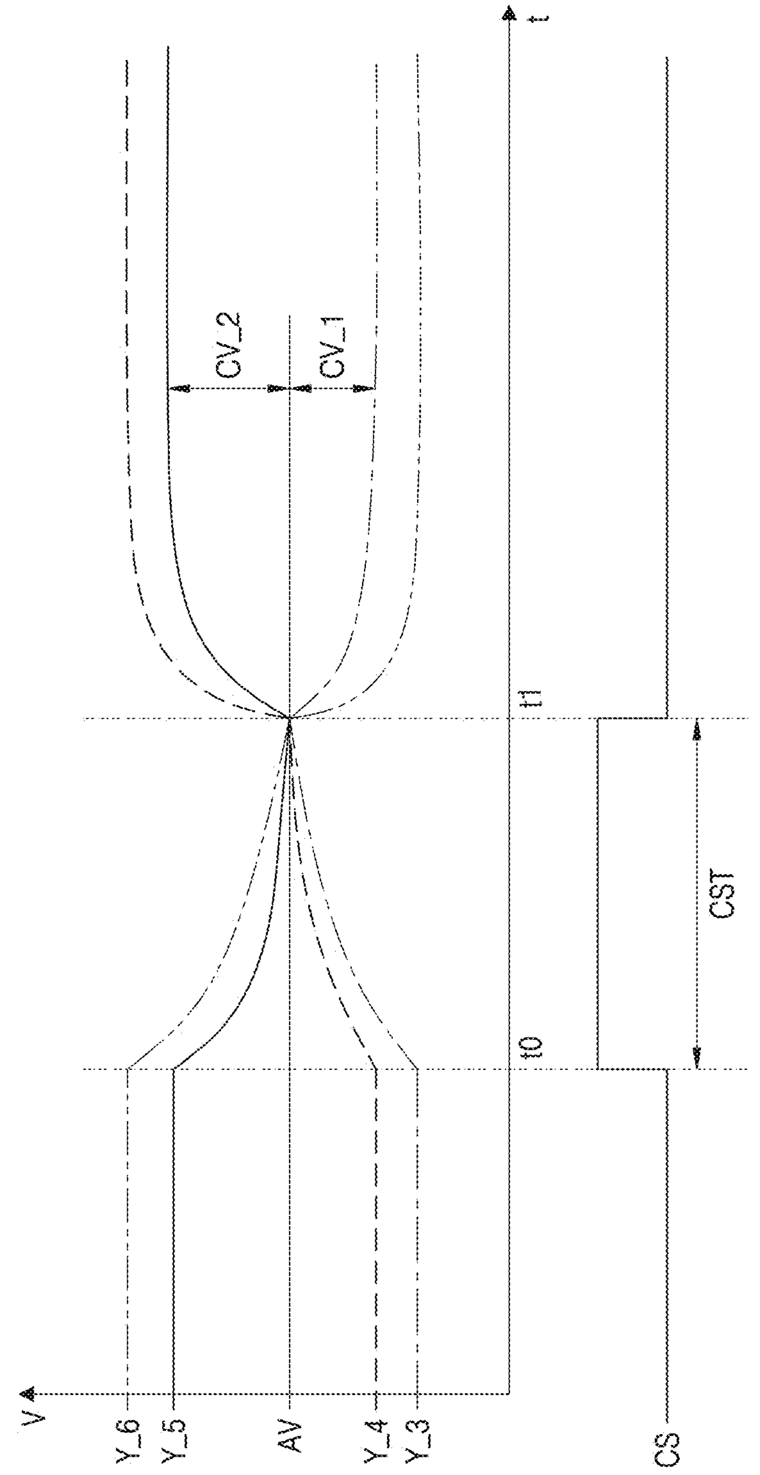
FIG. 7A is a timing diagram illustrating a data voltage and a charge sharing signal, according to a comparative example.

FIG. 7A is a timing diagram illustrating a data voltage and a charge sharing signal, according to a comparative example.

FIG. 7A illustrates third to sixth data voltages (that is, Y_3 to Y_6) respectively applied to third to sixth data lines by a source driver according to the comparative example, based on the $K-1^{-th}$ data packet DP_K−1 and the Kth data packet DP_K of FIG. 4. For convenience of description, although only the third to sixth data voltages (that is, Y_3 to Y_6) are shown in FIG. 7A, the remaining data voltages would also be comprehended from the following description.

In the graph of FIG. 7A for illustrating data voltages, the horizontal axis represents time and the vertical axis represents voltage levels. The respective voltage levels of the third to sixth data voltages (that is, Y_3 to Y_6) are based on the two most significant bits of the pieces of pixel data of FIG. 4. For example, when the two most significant bits of a piece of pixel data is 00, the piece of pixel data may correspond to a relatively high data voltage. On the other hand, when the two most significant bits of a piece of pixel data is 11, the piece of pixel data may correspond to a relatively low data voltage.

Referring to FIG. 7A, the source driver according to the comparative example may respectively output, to the third to sixth data lines, the third to sixth data voltages (that is, Y_3 to Y_6) respectively corresponding to the pieces of first pixel data D1_3 to D1_6 (see FIG. 4) of the $K-1^{-th}$ data packet DP_K−1 (see FIG. 4). In addition, before outputting the third to sixth data voltages (that is, Y_3 to Y_6) respectively corresponding to the pieces of second pixel data D2_3 to D2_6 (see FIG. 4) of the $K^{-th}$ data packet DP_K (see FIG. 4), the source driver according to the comparative example may output a charge sharing signal CS at an active level to a plurality of switches, which are respectively connected between the third to sixth data lines and a charge sharing line, at the same time (at a time point t0). The source driver may output the charge sharing signal CS having an active level during a charge sharing time CST (from t0 until t1), and the plurality of switches respectively connected with the third to sixth data lines may be turned on in response to the charge sharing signal CS at an active level. Therefore, the third to sixth data lines may be connected to each other via the charge sharing line and thus undergo charge sharing. Therefore, the voltage of the third to sixth data lines may be an average voltage AV of the third to sixth data voltages (that is, Y_3 to Y_6) respectively corresponding to the pieces of first pixel data D1_3 to D1_6 (see FIG. 4) of the $K-1^{-th}$ data packet DP_K−1 (see FIG. 4).

Next, at a time point t1, the source driver according to the comparative example may output the charge sharing signal CS having an inactive level, and the plurality of switches respectively connected with the third to sixth data lines may be turned off in response to the charge sharing signal CS. At the time point t1, the source driver according to the comparative example may also respectively output, to the third to sixth data lines, the third to sixth data voltages (that is, Y_3 to Y_6) respectively corresponding to the pieces of second pixel data D2_3 to D2_6 (see FIG. 4) of the Kth data packet DP_K (see FIG. 4).

Referring to FIG. 7A, because each of the fourth data voltage (that is, Y_4) and the sixth data voltage (that is, Y_6) simply increases or decreases, there is no unnecessary power consumption due to the charge sharing. On the other hand, because the third data voltage (that is, Y_3) according to the aforementioned operation of the source driver increases to the average voltage AV and then decreases again, power may be unnecessarily consumed by as much as a first consumption power CV_1. In addition, the fifth data voltage (that is, Y_5) according to the aforementioned operation of the source driver decreases to the average voltage AV and then increases again, power may be unnecessarily consumed by as much as second consumption power CV_2. That is, there may be unnecessary power consumption due to the charge sharing.

Figure 7B:
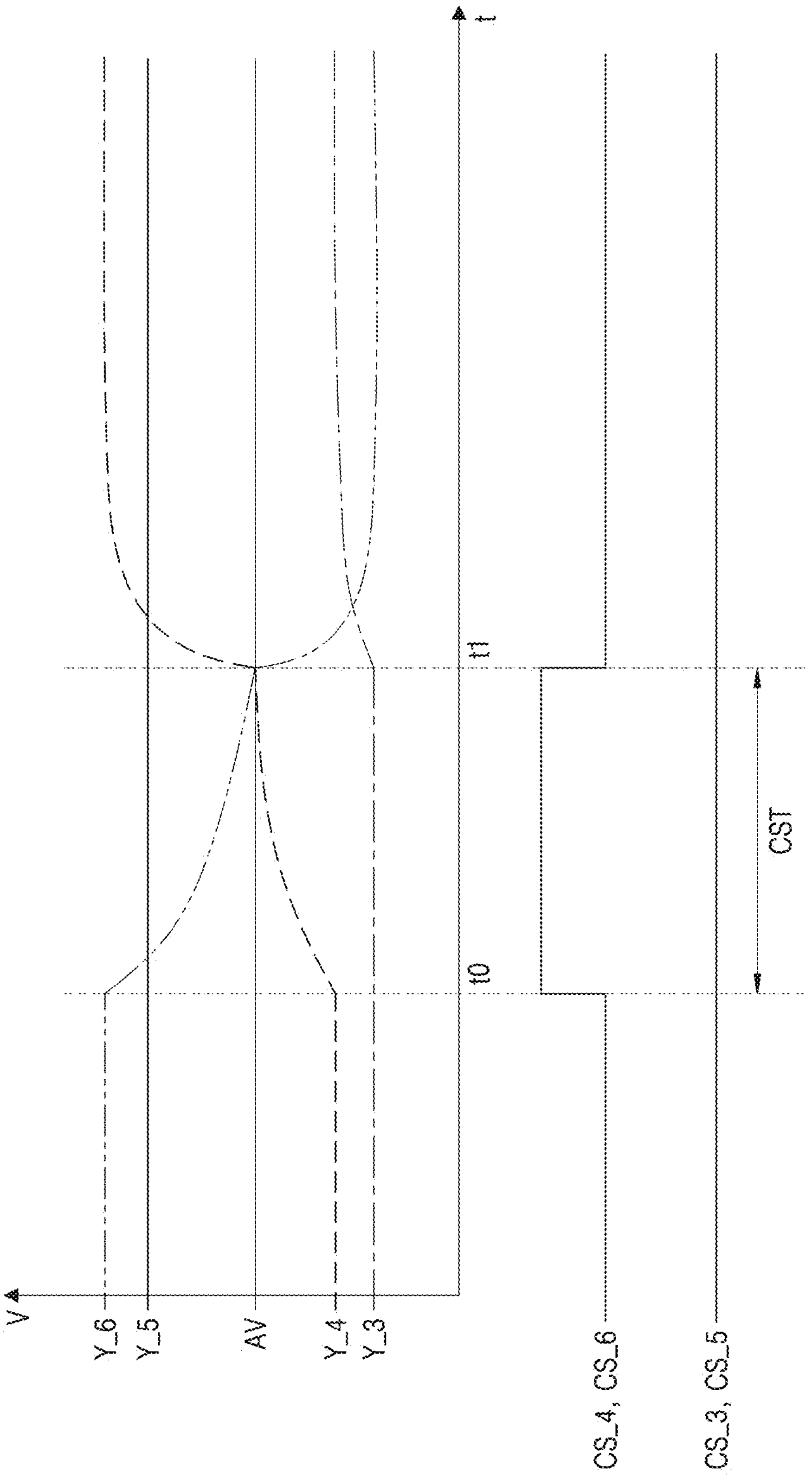
FIG. 7B is a timing diagram illustrating a data voltage and a charge sharing signal, according to an example embodiment.

FIG. 7B is a timing diagram illustrating a data voltage and a charge sharing signal, according to an example embodiment.

Descriptions regarding FIG. 7B may be made with reference to FIGS. 6 and 7A, and repeated descriptions may be omitted.

FIG. 7B illustrates the third to sixth data voltages (that is, Y_3 to Y_6) respectively applied to the third to sixth data lines by the source driver 114*a* (see FIG. 3) according to an example embodiment, based on the $K-1^{-th}$ data packet DP_K−1 and the Kth data packet DP_K of FIG. 4. For convenience of description, although only the third to sixth data voltages (that is, Y_3 to Y_6) are shown in FIG. 7B, the remaining data voltages would also be comprehended from the following description.

FIG. 7B illustrates that the source driver 114*a* (see FIG. 3) according to example embodiments performs charge sharing based on the types of the pieces of second pixel data of FIG. 6.

Referring to FIG. 7B, the source driver 114*a* (see FIG. 3) according to example embodiments may respectively output, to the third to sixth data lines, the third to sixth data voltages (that is, Y_3 to Y_6) respectively corresponding to the pieces of first pixel data D1_3 to D1_6 (see FIG. 4) of the K−1th data packet DP_K−1 (see FIG. 4). In addition, before outputting the third to sixth data voltages (that is, Y_3 to Y_6) respectively corresponding to the pieces of second pixel data D2_3 to D2_6 (see FIG. 4) of the $K^{-th}$ data packet DP_K (see FIG. 4), the source driver 114*a* (see FIG. 3) may respectively output charge sharing signals CS_4 and CS_6 at an active level to two switches respectively connected between the fourth and sixth data lines and the charge sharing line at the same time (at the time point t0), based on the type of each of the pieces of second pixel data of FIG. 6.

As described above, for each of the plurality of data lines, when a piece of first pixel data and a piece of second pixel data, which correspond to each other, have a difference 2 or more therebetween in terms of the value of two upper bits thereof, the charge sharing controller 340*a* (see FIG. 3) may determine the type of the piece of second pixel data to be "rise" or "fall". The charge sharing controller 340*a* (see FIG. 3) may output a charge sharing signal at an active level to at least two switches respectively connected to at least two data lines, which each correspond to a piece of second pixel data having a type of "rise" or "fall". The at least two switches are turned on in response to the charge sharing signal at an active level, and thus, the at least two data lines are connected with a charge sharing line, whereby charge sharing may be performed. That is, charge sharing may be performed by connecting only data lines, which each correspond to a piece of second pixel data having a type of "rise" or "fall", to each other.

Referring to FIG. 7B, the source driver 114*a* (see FIG. 3) may perform charge sharing through the connection between each of the fourth and sixth data lines and the charge sharing line by outputting a charge sharing signal having an active level during the charge sharing time CST (from t0 until t1). On the other hand, unlike the example of FIG. 7A, the source driver 114*a* (see FIG. 3) may not output a charge sharing signal at an active level (i.e., may not output a charge sharing signal or output a charge sharing signal at an inactive level) to two switches respectively connected with the third and fifth data lines, thereby not connecting the third and fifth data lines with the charge sharing line. Therefore, the voltage of the fourth and sixth data lines may be the average voltage AV of the fourth and sixth data voltages (that is, Y_4 and Y_6) respectively corresponding to the pieces of first pixel data D1_4 and D1_6 (see FIG. 4) of the $K-1^{-th}$ data packet DP_K−1 (see FIG. 4), and the voltages of the third and fifth data lines may be respectively maintained to be the third and fifth data voltages (that is, Y_3 and Y_5), which respectively correspond to the pieces of first pixel data D1_3 and D1_5 (see FIG. 4) of the $K-1^{-th}$ data packet DP_K−1 (see FIG. 4), until the time point t1.

Next, at the time point t1, the source driver 114*a* may stop outputting the charge output, or may output the charge sharing signal CS having an inactive level, and the plurality of switches respectively connected with the fourth and sixth data lines may be turned off. At the time point t1, the source driver 114*a* (see FIG. 3) may also respectively output, to the third to sixth data lines, the third to sixth data voltages (that is, Y_3 to Y_6) respectively corresponding to the pieces of second pixel data D2_3 to D2_6 (see FIG. 4) of the $K^{-th}$ data packet DP_K (see FIG. 4).

Referring together to FIGS. 7A and 7B, the source driver 114*a* (see FIG. 3) may perform charge sharing by comparing a piece of first pixel data with a piece of second pixel data, which correspond to the same data line, in terms of upper two bits thereof, thereby reducing or preventing unnecessary power consumption due to the charge sharing.

The source driver 114 (see FIG. 2) may receive a plurality of pieces of first pixel data, which respectively correspond to a plurality of data lines, and a plurality of pieces of second pixel data, which respectively correspond to the plurality of pieces of first pixel data, and may output a charge sharing signal having an active level to switches respectively connected to at least two data lines, each corresponding to a piece of first pixel data and a piece of second pixel data, which have a difference of 2 or more therebetween in terms of the value of two upper bits thereof, from among the plurality of data lines, thereby reducing or preventing unnecessary power consumption due to charge sharing.

Figure 8:
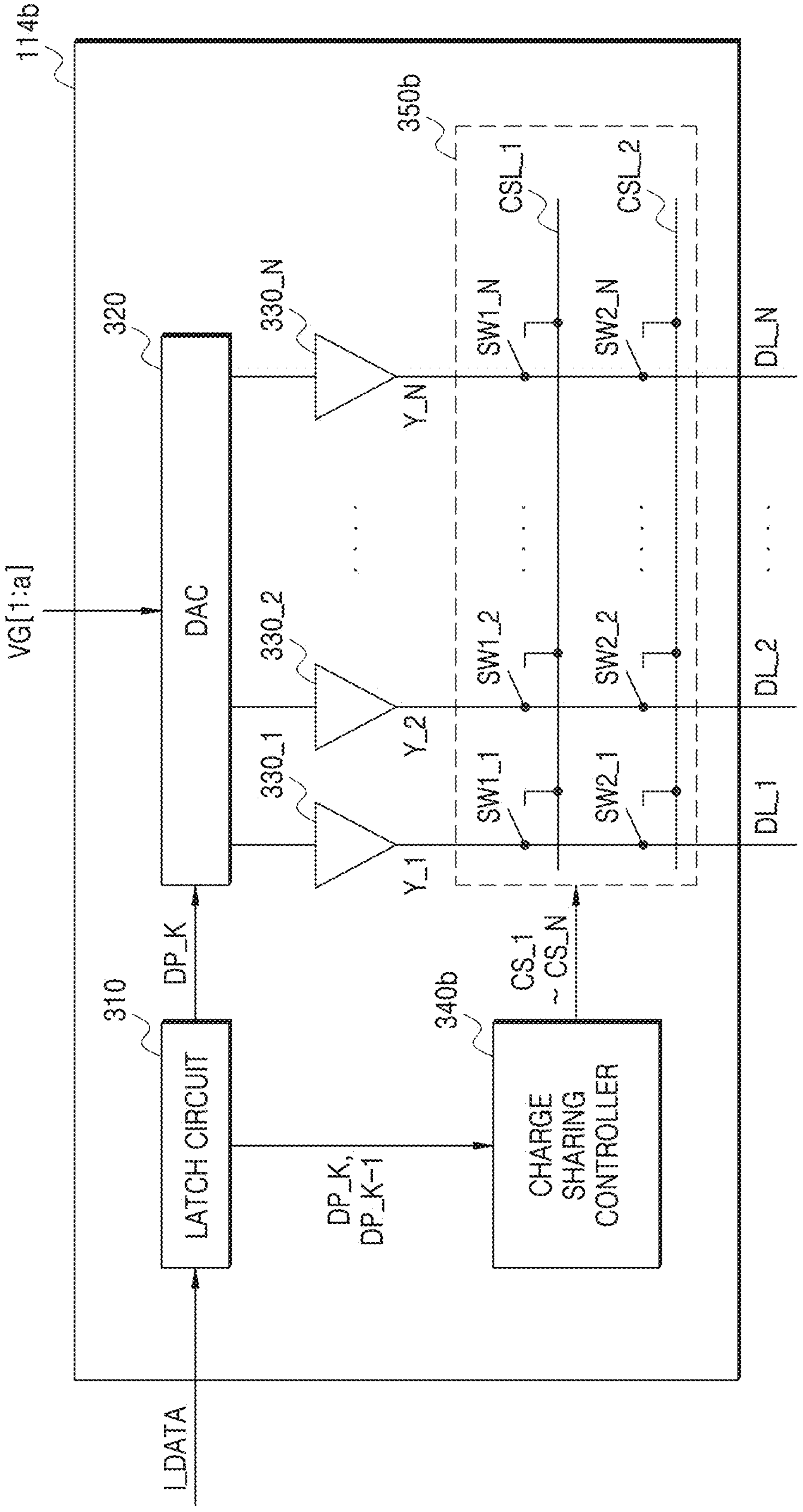
FIG. 8 is a block diagram illustrating a source driver according to an example embodiment.

FIG. 8 is a block diagram illustrating a source driver according to an example embodiment.

Descriptions regarding FIG. 8 may be made with reference to FIG. 3, and a source driver 114*b* of FIG. 8 may correspond to the source driver 114 of FIG. 2.

Referring to FIG. 8, the source driver 114*b* may include the latch circuit 310, the digital-to-analog conversion circuit 320, the plurality of buffers 330_1 to 330_N, a charge sharing controller 340*b*, and a switch circuit 350*b*. The source driver 114*b* may be implemented by one semiconductor chip. Alternatively, the function of the source driver 114*b* may be implemented in a semiconductor device, such as an SoC or the like. The latch circuit 310, the digital-to-analog conversion circuit 320, and the plurality of buffers 330_1 to 330_N of FIG. 8 have been described with reference to FIG. 3, and thus, repeated descriptions thereof are omitted.

The switch circuit 350*b* may include a plurality of first switches SW1_1 to SW1_N, which are respectively connected between a first charge sharing line CSL_1 and the plurality of data lines DL_1 to DL_N, and a plurality of second switches SW2_1 to SW2_N, which are respectively connected between a second charge sharing line CSL_2 and the plurality of data lines DL_1 to DL_N. For example, the first switch SW1_1 may be connected between the first data line (that is, DL_1) and the first charge sharing line CSL_1, the first switch SW1_2 may be connected between the second data line (that is, DL_2) and the first charge sharing line CSL_1, and the first switch SW1_N may be connected between the $N^{-th}$ data line (that is, DL_N) and the first charge sharing line CSL_1. Similarly, the second switch SW2_1 may be connected between the first data line (that is, DL_1) and the second charge sharing line CSL_2, the second switch SW2_2 may be connected between the second data line (that is, DL_2) and the second charge sharing line CSL_2, and the second switch SW2_N may be connected between the $N^{-th}$ data line (that is, DL_N) and the second charge sharing line CSL_2.

As described above, the charge sharing controller 340*b* may receive two consecutive data packets (that is, DP_K−1 and DP_K) and may compare two pieces of pixel data with each other, the two pieces of pixel data being respectively included in the two consecutive data packets (that is, DP_K−1 and DP_K) and corresponding to the same data line. The charge sharing controller 340*b* may be configured to output the charge sharing signals CS_1 to CS_N to the switch circuit 350*b*, based on a comparison result.

For example, referring to FIG. 4, the charge sharing controller 340*b* may receive the K−$1^{-th}$ data packet DP_K−1 and the $K^{-th}$ data packet DP_K, and may output the charge sharing signal CS_1 to one of the first switch SW1_1 and the second switch SW2_1 by comparing the piece of first pixel data D1_1, which corresponds to the first data line (that is, DL_1) from among the pieces of first pixel data D1_1 to D1_8 of the K−$1^{-th}$ data packet DP_K−1, with the piece of second pixel data D2_1, which corresponds to the first data line (that is, DL_1) from among the pieces of second pixel data D2_1 to D2_8 of the $K^{-th}$ data packet DP_K. Although two pieces of pixel data corresponding to the first data line (that is, DL_1) are described in the example set forth above, the charge sharing controller 340*b* may output a charge sharing signal by comparing two pieces of pixel data corresponding to each of the remaining data lines, similar to the example set forth above.

The first switches SW1_1 to SW1_N may be turned on in response to the charge sharing signals CS_1 to CS_N corresponding thereto at an active level, respectively. For example, when the first switches SW1_1, SW1_2, and SW1_N are turned on respectively in response to the charge sharing signals CS_1, CS_2 at an active level, and CS_N, the data lines DL_1, DL_2, and DL_N respectively connected with the first switches SW1_1, SW1_2, and SW1_N may be connected to each other via the first charge sharing line CSL_1. Similarly, the second switches SW2_1 to SW2_N may be turned on in response to the charge sharing signals CS_1 to CS_N corresponding thereto at an active level, respectively. For example, when the second switches SW2_1, SW2_2, and SW2_N are turned on respectively in response to the charge sharing signals CS_1, CS_2, and CS_N at an active level, the data lines DL_1, DL_2, and DL_N respectively connected with the second switches SW2_1, SW2_2, and SW2_N may be connected to each other via the second charge sharing line CSL_2.

As described above, the charge sharing controller 340*b* may output, at an active level, a charge sharing signal (for example, CS_1) to one of a first switch (for example, SW1_1) and a second switch (for example, SW2_1), which are connected to one data line (for example, DL_1) by comparing a piece of first pixel data and a piece of second pixel data, which correspond to the one data line (for example, DL_1). Therefore, a data line connected with the first charge sharing signal CSL_1 may be different from a data line connected with the second charge sharing signal CSL_2. Therefore, the source driver 114*b* may perform charge sharing on only the data lines connected with the first charge sharing signal CSL_1 and perform charge sharing on only the data lines connected with the second charge sharing signal CSL_2.

FIG. 9 illustrates the types of pieces of pixel data, to which a three most significant bits comparison table is applied, according to an example embodiment.

Descriptions regarding FIG. 9 may be made with reference to FIGS. 4 and 5. Specifically, FIG. 9 illustrates a result of respectively comparing the pieces of first pixel data D1_1 to D1_8 (see FIG. 4) of the K−$1^{-th}$ data packet DP_K−1 of FIG. 4 with the pieces of second pixel data D2_1 to D2_8 (see FIG. 4) of the $K^{-th}$ data packet DP_K in terms of three upper bits (that is, 3MSB) thereof.

Referring to FIG. 4, the respective three most significant bits of the pieces of first pixel data D1_1 to D1_8 (see FIG. 4) of the K−$1^{-th}$ data packet DP_K−1 are 010, 011, 111, 100, 010, 001, 100, and 001 in the stated order, and the respective three most significant bits of the pieces of second pixel data D2_1 to D2_8 (see FIG. 4) of the $K^{-th}$ data packet DP_K are 111, 001, 101, 001, 011, 111, 111, and 011 in the stated order.

For each of the plurality of data lines, when a piece of first pixel data and a piece of second pixel data, which correspond to each other, have the same value in the uppermost bit from among three upper bits (that is, 3MSB) thereof, the two most significant bits comparison table of FIG. 5 may be applied to the remaining two bits thereof except for the uppermost bit from among the three upper bits. For example, the three most significant bits of a piece of first pixel data and a piece of second pixel data, which correspond to the fifth data line (that is, DL_5), may be 010 and 011, respectively. The respective uppermost bits of the piece of first pixel data and the piece of second pixel data are equal to each other as 0. Therefore, when the two most significant bits comparison table of FIG. 5 is applied to the remaining two bits, the piece of first pixel data and the piece of second pixel data have a difference less than 2 therebetween in the value of the remaining two bits thereof, and thus, the type of the piece of second pixel data may be "maintain".

When the piece of first pixel data and the piece of second pixel data, which correspond to each other, are different from each other in terms of the uppermost bit from among the three upper bits (that is, the 3MSB) thereof, the type of the piece of second pixel data may be "maintain" regardless of the remaining two bits thereof.

When the piece of first pixel data and the piece of second pixel data, which correspond to each other, have the same value of 0 in the uppermost bit from among the three upper bits thereof and have a difference of 2 or more therebetween in the value of the remaining two bits thereof except for the uppermost bit from among the three upper bits, the piece of second pixel data may fall within a first group. Specifically, the charge sharing controller 340*b* (see FIG. 8) may determine the type of the piece of second pixel data by applying the two most significant bits comparison table of FIG. 5 to the remaining two bits thereof. For example, the three most significant bits of a piece of first pixel data and a piece of second pixel data, which correspond to the second data line (that is, DL_2), may be 011 and 001, respectively. Because the piece of first pixel data and the piece of second pixel data have the same value of 0 in the uppermost bit thereof and have a difference of 2 therebetween in the value of the remaining two bits thereof (that is, a difference between 11 and 01), the piece of second pixel data may fall within the first group. In addition, when the two most significant bits comparison table of FIG. 5 is applied to the remaining-two-bits values thereof (that is, 11 and 01), the remaining-two-bits value (that is, 01) of the piece of second pixel data is less than the remaining-two-bits value (that is, 11) of the piece of first pixel data by 2 or more, and thus, the type of the piece of second pixel data may be "first group fall (that is, G1_Fall)".

When the piece of first pixel data and the piece of second pixel data, which correspond to each other, have the same value of 1 in the uppermost bit from among the three upper bits thereof and have a difference of 2 or more therebetween in the value of the remaining two bits thereof except for the uppermost bit from among the three upper bits, the piece of second pixel data may fall within a second group. Specifically, the charge sharing controller 340*b* (see FIG. 8) may determine the type of the piece of second pixel data by applying the two most significant bits comparison table of FIG. 5 to the remaining two bits thereof. For example, the three most significant bits of a piece of first pixel data and a piece of second pixel data, which correspond to the third data line (that is, DL_3), may be 111 and 101, respectively. Because the piece of first pixel data and the piece of second pixel data have the same value of 1 in the uppermost bit thereof and have a difference of 2 therebetween in the value of the remaining two bits thereof, the piece of second pixel data may fall within the second group. In addition, when the two most significant bits comparison table of FIG. 5 is applied to the remaining-two-bits values thereof (that is, 11 and 01), the remaining-two-bits value (that is, 01) of the piece of second pixel data is less than the remaining-two-bits value (that is, 11) of the piece of first pixel data by 2 or more, and thus, the type of the piece of second pixel data may be "second group fall (that is, G2_Fall)".

The types of the pieces of pixel data in FIG. 9 would be comprehended by referring to the above description. For example, the types of the pieces of pixel data may also be "first group rise (that is, G1_Rise)", "second group rise (that is, G2_Rise)", "maintain", etc.

Figure 10:
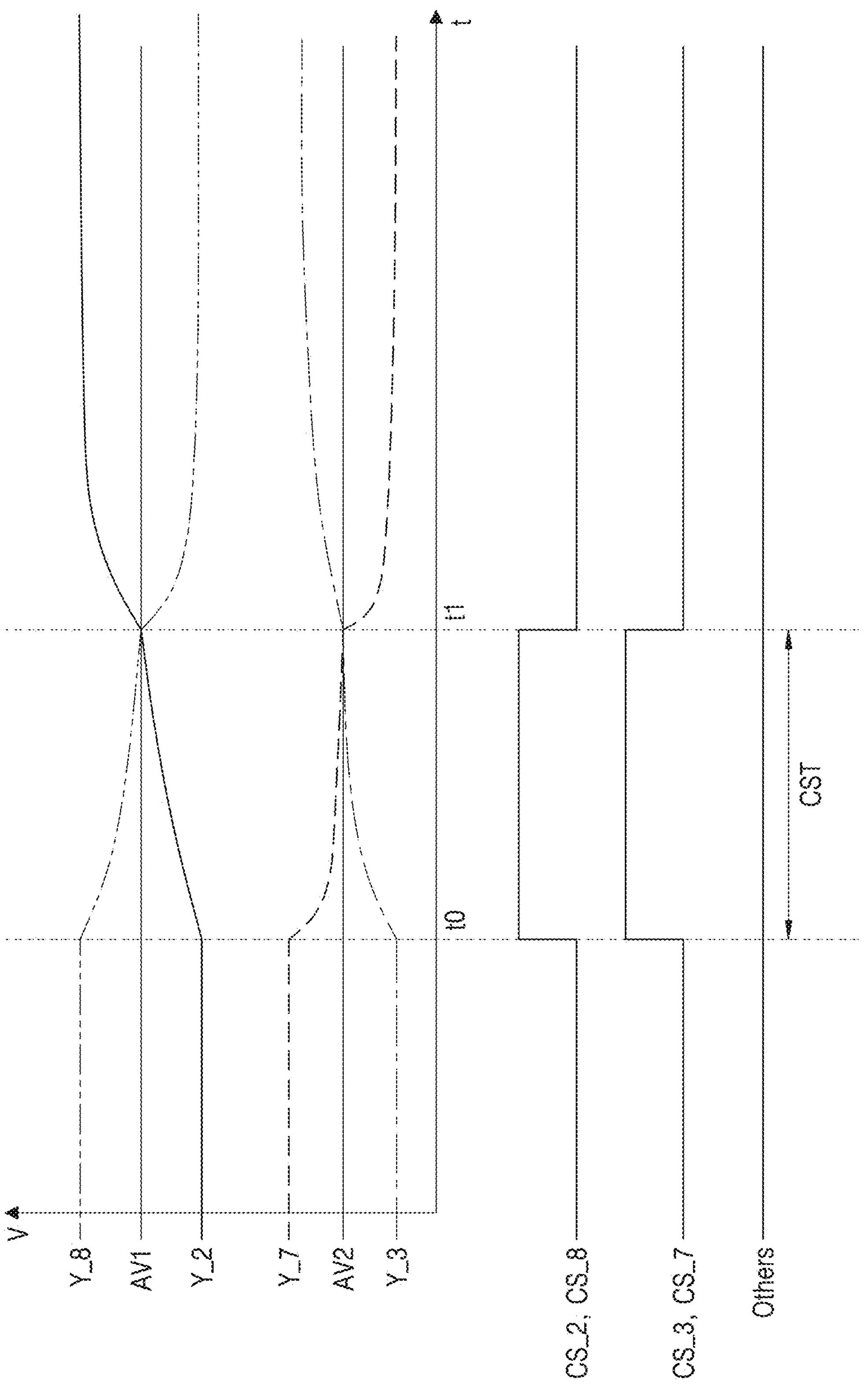
FIG. 10 is a timing diagram illustrating a data voltage and a charge sharing signal, according to an example embodiment.

FIG. 10 is a timing diagram illustrating a data voltage and a charge sharing signal, according to an example embodiment.

Descriptions regarding FIG. 10 may be made with reference to FIG. 9, and repeated descriptions may be omitted.

FIG. 10 illustrates a second data voltage Y_2, a third data voltages Y_3, a seventh data voltage Y_7, and an eighth data voltage Y_8, which are respectively applied to a second data line, a third data line, a seventh data line, and an eighth data line by the source driver 114*b* (see FIG. 8) based on the K−1$^{-th}$ data packet DP_K−1 and the K$^{-th}$ data packet DP_K of FIG. 4. For convenience of description, although only the second data voltage Y_2, the third data voltages Y_3, the seventh data voltage Y_7, and the eighth data voltage Y_8 are shown in FIG. 10, the remaining data voltages respectively applied to the remaining data lines would also be easily comprehended from the following description.

FIG. 10 illustrates that the source driver 114*b* (see FIG. 8) performs charge sharing based on the types of the pieces of second pixel data of FIG. 9.

In the graph of FIG. 10 for illustrating data voltages, the horizontal axis represents time and the vertical axis represents voltage levels. The respective voltage levels of the second data voltage (that is, Y_2), the third data voltages (that is, Y_3), the seventh data voltage (that is, Y_7), and the eighth data voltage (that is, Y_8) are based on the three most significant bits of the pieces of pixel data of FIG. 4. For example, when the three most significant bits of a piece of pixel data is 000, the piece of pixel data may correspond to a data voltage having a relatively high level. On the other hand, when the three most significant bits of a piece of pixel data is 111, the piece of pixel data may correspond to a data voltage having a relatively low level.

Referring to FIG. 10, the source driver 114*b* (see FIG. 8) may output the second data voltage (that is, Y_2), the third data voltages (that is, Y_3), the seventh data voltage (that is, Y_7), and the eighth data voltage (that is, Y_8), which respectively correspond to the pieces of first pixel data D1_2, D1_3, D1_7, and D1_8 (see FIG. 4) of the K−1$^{-th}$ data packet DP_K−1 (see FIG. 4), to the second data line, the third data line, the seventh data line, and the eighth data line, respectively.

In addition, before outputting the second data voltage (that is, Y_2), the third data voltages (that is, Y_3), the seventh data voltage (that is, Y_7), and the eighth data voltage (that is, Y_8), which respectively correspond to the pieces of second pixel data D2_2, D2_3, D2_7, and D2_8 (see FIG. 4) of the K$^{-th}$ data packet DP_K (see FIG. 4), the source driver 114*b* (see FIG. 8) may output the charge sharing signals CS_2, CS_3, CS_7, and CS_8 at an active level to one of a first switch and a second switch, which are connected with each of the second data line, the third data line, the seventh data line, and the eighth data line, based on the respective types of the pieces of second pixel data of FIG. 9. The source driver 114*b* (see FIG. 8) may not output charge sharing signals at an active level (i.e., may not output a charge sharing signal or output a charge sharing signal at an inactive level) (shown as Others in FIG. 8) to switches respectively connected with the remaining data lines.

As described above, for each of the plurality of data lines, when a piece of first pixel data and a piece of second pixel data, which correspond to each other, each have a value of 0 in the uppermost bit thereof and have a difference of 2 or more therebetween in the value of the remaining two bits except for the uppermost bit from among the three upper bits thereof, the charge sharing controller 340*b* (see FIG. 8) may determine the type of the piece of second pixel data to be "first group rise" or "first group fall". Similarly, for each of the plurality of data lines, when a piece of first pixel data and a piece of second pixel data, which correspond to each other, each have a value of 1 in the uppermost bit thereof and have a difference of 2 or more therebetween in the value of the remaining two bits except for the uppermost bit from among the three upper bits thereof, the charge sharing controller 340*b* (see FIG. 8) may determine the type of the piece of second pixel data to be "second group rise" or "second group fall".

The charge sharing controller 340*b* (see FIG. 8) may output the charge sharing signals CS_2 and CS_8 at an active level to one of the first switch and the second switch, which are connected to each of at least two data lines corresponding to a piece of second pixel data having a type of "first group rise" or "first group fall". A switch is turned on in response to the charge sharing signals CS_2 and CS_8 at an active level, and thus, the at least two data lines are connected with a charge sharing line, whereby charge sharing may be performed. That is, charge sharing may be performed by connecting only data lines, which correspond to a piece of second pixel data having a type of "first group rise" or "first group fall", to each other.

Similarly, the charge sharing controller 340*b* (see FIG. 8) may output the charge sharing signals CS_3 and CS_7 at an active level to one of the first switch and the second switch, which are connected to each of at least two data lines corresponding to a piece of second pixel data having a type of "second group rise" or "second group fall". A switch is turned on in response to the charge sharing signals CS_3 and CS_7 at an active level, and thus, the at least two data lines are connected with a charge sharing line, whereby charge sharing may be performed. That is, charge sharing may be performed by connecting only data lines, which correspond to a piece of second pixel data having a type of "second group rise" or "second group fall", to each other.

Referring to FIGS. 9 and 10, the source driver 114*b* (see FIG. 8) may operate based on the respective types of the pieces of second pixel data of FIG. 9. The source driver 114*b* (see FIG. 8) may output the charge sharing signal CS_2, CS_3, CS_7, and CS_8 having an active level during the charge sharing time CST (from t0 until t1), thereby performing charge sharing by connecting each of the second and eighth data lines with the first charge sharing line CSL_1 (see FIG. 8) and performing charge sharing by connecting each of the third and seventh data lines with the second charge sharing line CSL_2 (see FIG. 8).

As a result of the charge sharing performed by the source driver 114b (see FIG. 8), the voltage of the second and eighth data lines may be a first average voltage AV1, which is an average voltage of the second data voltage (that is, Y_2) and the eighth data voltage (that is, Y_8) respectively corresponding to the pieces of first pixel data D1_2 and D1_8 (see FIG. 4) of the $K-1^{-th}$ data packet DP_K−1 (see FIG. 4), and the voltage of the third and seventh data lines may be a second average voltage AV2, which is an average voltage of the third data voltage (that is, Y_3) and the seventh data voltage (that is, Y_7) respectively corresponding to the pieces of first pixel data D1_3 and D1_7 (see FIG. 4) of the $K-1^{-th}$ data packet DP_K−1 (see FIG. 4).

In the example described with reference to FIG. 10, although it is described that charge sharing is performed by connecting each of the second and eighth data lines with the first charge sharing line CSL_1 (see FIG. 8) and connecting each of the third and seventh data lines with the second charge sharing line CSL_2 (see FIG. 8), example embodiments are not limited thereto, and the source driver 114b (see FIG. 8) may perform charge sharing by connecting each of the second and eighth data lines with the second charge sharing line CSL_2 (see FIG. 8) and connecting each of the third and seventh data lines with the first charge sharing line CSL_1 (see FIG. 8).

Referring to FIG. 9, the source driver 114b (see FIG. 8) may not output a charge sharing signal at an active level (i.e., may not output a charge sharing signal or output a charge sharing signal at an inactive level) to the first switch and the second switch, which are each connected with data lines respectively corresponding to the pieces of second pixel data having a type of “maintain” of FIG. 9. Therefore, the first data line, the fourth data line, the fifth data line, and the sixth data line are not connected with the first charge sharing line CSL_1 (see FIG. 8) and the second charge sharing line CSL_2 (see FIG. 8) and thus may not undergo charge sharing. Therefore, the voltages of the first data line, the fourth data line, the fifth data line, and the sixth data line may be respectively maintained to be the first data voltage (that is, Y_1), the fourth data voltage (that is, Y_4), the fifth data voltage (that is, Y_5), and the sixth data voltage (that is, Y_6), which respectively correspond to the pieces of first pixel data D1_1, D1_4, D1_5, and D1_6 (see FIG. 4) of the $K-1^{-th}$ data packet DP_K−1 (see FIG. 4), until the time point t1.

Next, at the time point t1, the source driver 114b may stop outputting the charge output, or may output the charge sharing signal CS having an inactive level, and the plurality of switches respectively connected with the second, third, seventh and eight data lines may be turned off. At the time point t1, the source driver 114b (see FIG. 8) may also output the second data voltage (that is, Y_2), the third data voltage (that is, Y_3), the seventh data voltage (that is, Y_7), and the eighth data voltage (that is, Y_8), which respectively correspond to the pieces of second pixel data D2_2, D2_3, D2_7, and D2_8 (see FIG. 4) of the Kth data packet DP_K (see FIG. 4), to the second data line, the third data line, the seventh data line, and the eighth data line, respectively.

Referring to FIG. 10, the source driver 114b (see FIG. 8) may perform charge sharing on data lines respectively corresponding to pieces of pixel data falling within the same group, and thus, unnecessary power consumption due to the charge sharing may be reduced or prevented. Therefore, the source driver 114b (see FIG. 8) may output a charge sharing signal having an active level to one of a first switch and a second switch, which are connected to each of at least two data lines from among a plurality of data lines, each of the at least two data lines corresponding to a piece of first pixel data and a piece of second pixel data, which have the same value in the uppermost bit from among three upper bits thereof and have a difference of 2 or more therebetween in the value of the remaining two bits except for the uppermost bit from among the three upper bits thereof.

Figure 11:
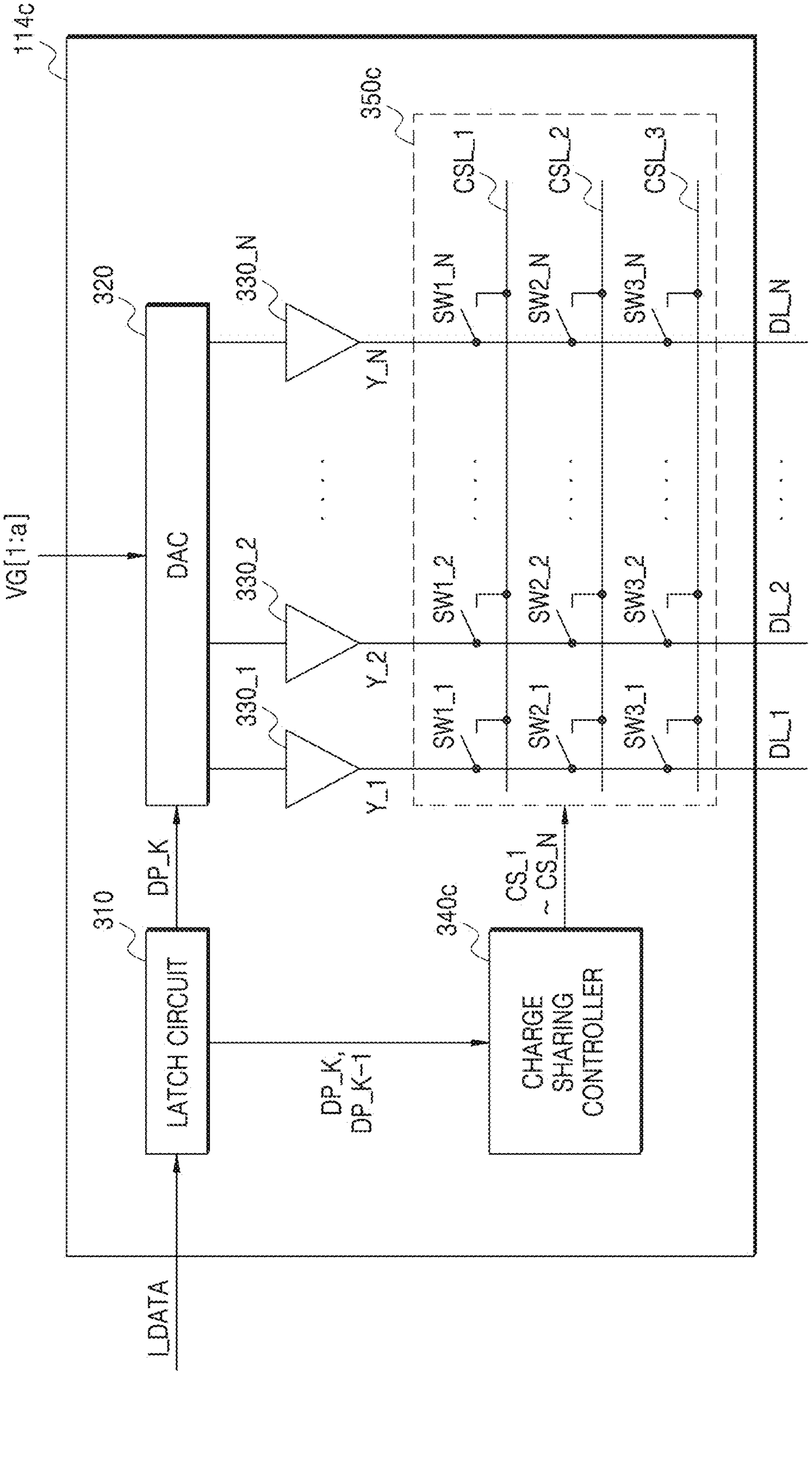
FIG. 11 is a block diagram illustrating a source driver according to an example embodiment.

FIG. 11 is a block diagram illustrating a source driver according to an example embodiment.

Referring to FIG. 11, a source driver 114c may include the latch circuit 310, the digital-to-analog conversion circuit 320, the plurality of buffers 330_1 to 330_N, a charge sharing controller 340c, and a switch circuit 350c. The source driver 114c may be implemented by one semiconductor chip. Alternatively, the function of the source driver 114c may be implemented in a semiconductor device, such as an SoC or the like. The latch circuit 310, the digital-to-analog conversion circuit 320, and the plurality of buffers 330_1 to 330_N of FIG. 11 have been described with reference to FIG. 3, and thus, repeated descriptions thereof are omitted.

The switch circuit 350c may include a plurality of first switches SW1_1 to SW1_N, which are respectively connected between a first charge sharing line CSL_1 and a plurality of data lines DL_1 to DL_N, a plurality of second switches SW2_1 to SW2_N, which are respectively connected between a second charge sharing line CSL_2 and the plurality of data lines DL_1 to DL_N, and a plurality of third switches SW3_1 to SW3_N, which are respectively connected between a third charge sharing line CSL_3 and the plurality of data lines DL_1 to DL_N.

For example, the first switch SW1_1 may be connected between the first data line (that is, DL_1) and the first charge sharing line CSL_1, the first switch SW1_2 may be connected between the second data line (that is, DL_2) and the first charge sharing line CSL_1, and the first switch SW1_N may be connected between the $N^{-th}$ data line (that is, DL_N) and the first charge sharing line CSL_1. Similarly, the second switch SW2_1 may be connected between the first data line (that is, DL_1) and the second charge sharing line CSL_2, the second switch SW2_2 may be connected between the second data line (that is, DL_2) and the second charge sharing line CSL_2, and the second switch SW2_N may be connected between the $N^{-th}$ data line (that is, DL_N) and the second charge sharing line CSL_2. The third switch SW3_1 may be connected between the first data line (that is, DL_1) and the third charge sharing line CSL_3, the third switch SW3_2 may be connected between the second data line (that is, DL_2) and the third charge sharing line CSL_3, and the third switch SW3_N may be connected between the $N^{-th}$ data line (that is, DL_N) and the third charge sharing line CSL_3.

As described above, the charge sharing controller 340c may receive two consecutive data packets from the latch circuit 310. For example, the charge sharing controller 340c may receive the $K-1^{-th}$ data packet DP_K−1 and the $K^{-th}$ data packet DP_K, which are consecutive to each other, from the latch circuit 310.

The charge sharing controller 340c may respectively output the charge sharing signals CS_1 to CS_N at an active level to one set from among a set of the first switches SW1_1 to SW1_N, a set of the second switches SW2_1 to SW2_N, and a set of the third switches SW3_1 to SW3_N, which are respectively connected to the plurality of data lines DL_1 to DL_N. For example, the charge sharing controller 340c may output the charge sharing signal CS_1 at an active level to one of the first switch SW1_1, the second switch SW2_1, and the third switch SW3_1, which are connected with the first data line (that is, DL_1) corresponding thereto, may output the charge sharing signal CS_2 at an active level to one of the first switch SW1_2, the second switch SW2_2, and the third switch SW3_2, which are connected with the second data line (that is, DL_2) corresponding thereto, and may output the charge sharing signal CS_N at an active level to one of the first switch SW1_N, the second switch SW2_N, and the third switch SW3_N, which are connected with the $N^{-th}$ data line (that is, DL_N) corresponding thereto.

As described above, the charge sharing controller 340*c* may receive two consecutive data packets (that is, DP_K−1 and DP_K) and may compare two pieces of pixel data with each other, the two pieces of pixel data being respectively included in the two consecutive data packets (that is, DP_K−1 and DP_K) and corresponding to the same data line. The charge sharing controller 340*c* may be configured to output the charge sharing signals CS_1 to CS_N to the switch circuit 350*c*, based on a result of the comparison.

For example, referring to FIG. 4, the charge sharing controller 340*c* may receive the $K-1^{-th}$ data packet DP_K−1 and the $K^{-th}$ data packet DP_K, and may output the charge sharing signal CS_1 at an active level to one of the first switch SW1_1, the second switch SW2_1, and the third switch SW3_1 by comparing the piece of first pixel data D1_1, which corresponds to the first data line (that is, DL_1) from among the pieces of first pixel data D1_1 to D1_8 of the $K-1^{-th}$ data packet DP_K−1, with the piece of second pixel data D2_1, which corresponds to the first data line (that is, DL_1) from among the pieces of second pixel data D2_1 to D2_8 of the $K^{-th}$ data packet DP_K. In the aforementioned example, although two pieces of pixel data corresponding to the first data line (that is, DL_1) are described, the charge sharing controller 340*c* may output a charge sharing signal by comparing two pieces of pixel data corresponding to each of the remaining data lines in a similar manner to that of the aforementioned example.

The first switches SW1_1 to SW1_N may be turned on in response to the charge sharing signals CS_1 to CS_N corresponding thereto, respectively, at an active level. For example, when the first switches SW1_1, SW1_2, and SW1_N are turned on respectively in response to the charge sharing signal CS_1, CS_2, and CS_N at an active level, the data lines DL_1, DL_2, and DL_N respectively connected with the first switches SW1_1, SW1_2, and SW1_N may be connected to each other via the first charge sharing line CSL_1. Similarly, the second switches SW2_1 to SW2_N may be turned on in response to the charge sharing signals CS_1 to CS_N corresponding thereto, respectively. For example, when the second switches SW2_1, SW2_2, and SW2_N are turned on respectively in response to the charge sharing signal CS_1, CS_2, and CS_N, the data lines DL_1, DL_2, and DL_N respectively connected with the second switches SW2_1, SW2_2, and SW2_N may be connected to each other via the second charge sharing line CSL_2. Similarly, the third switches SW3_1 to SW3_N may be turned on in response to the charge sharing signals CS_1 to CS_N corresponding thereto, respectively. For example, when the third switches SW3_1, SW3_2, and SW3_N are turned on respectively in response to the charge sharing signal CS_1, CS_2, and CS_N at an active level, the data lines DL_1, DL_2, and DL_N respectively connected with the third switches SW3_1, SW3_2, and SW3_N may be connected to each other via the third charge sharing line CSL_3.

As described above, the charge sharing controller 340*c* may compare a piece of first pixel data and a piece of second pixel data, which correspond to one data line (for example, DL_1), and thus output a charge sharing signal at an active level (for example, CS_1) to one of a first switch (for example, SW1_1), a second switch (for example, SW2_1), and a third switch (for example, SW3_1), which are connected to the one data line (for example, DL_1). Therefore, data lines connected with the first charge sharing line CSL_1, data lines connected with the second charge sharing line CSL_2, and data lines connected with the third charge sharing line CSL_3 may be different from each other. Therefore, the source driver 114*c* may perform charge sharing on only the data lines connected with the first charge sharing line CSL_1, may perform charge sharing on only the data lines connected with the second charge sharing line CSL_2, and may perform charge sharing on only the data lines connected with the third charge sharing line CSL_3.

FIG. 12 illustrates the types of pieces of pixel data, to which a most significant bit comparison table is applied, according to an example embodiment.

Descriptions regarding FIG. 12 may be made with reference to FIGS. 4 and 5. Specifically, FIG. 12 illustrates a result of respectively comparing the pieces of first pixel data D1_1 to D1_8 (see FIG. 4) of the $K-1^{-th}$ data packet DP_K−1 of FIG. 4 with the pieces of second pixel data D2_1 to D2_8 (see FIG. 4) of the $K^{-th}$ data packet DP_K of FIG. 4 in terms of the three most significant bits and the two most significant bits thereof.

Referring to FIG. 12, as described with reference to FIG. 9, when a piece of first pixel data and a piece of second pixel data, which correspond to each other, have the same value in the uppermost bit from among three upper bits (that is, 3MSB) thereof, the types of the pieces of second pixel data respectively corresponding to the first to eighth data lines (that is, DL_1 to DL_8) may be determined by applying the two most significant bits comparison table to the remaining two bits except for the uppermost bit from among the three upper bits for each of the piece of first pixel data and the piece of second pixel data.

However, when the piece of first pixel data and the piece of second pixel data, which correspond to each other, have different values from each other in the uppermost bit thereof, unlike the example described with reference to FIG. 9, the types of the pieces of second pixel data respectively corresponding to the first to eighth data lines (that is, DL_1 to DL_8) may be determined by applying the two most significant bits comparison table to two upper bits including the uppermost bit for each of the piece of first pixel data and the piece of second pixel data.

The types of the pieces of second pixel data respectively corresponding to the first to eighth data lines (that is, DL_1 to DL_8) in FIG. 12 may be understood to be a union of FIG. 6 and FIG. 9. The types of the pieces of second pixel data respectively corresponding to the first to eighth data lines (that is, DL_1 to DL_8) in FIG. 12 may be easily comprehended by referring to FIGS. 6 and 9, and thus, detailed descriptions thereof are omitted.

A source driver may output a charge sharing signal to switches respectively connected to, from among a plurality of data lines, at least two data lines, each corresponding to a piece of first pixel data and a piece of second pixel data, which are different from each other in at least two upper bits thereof. Referring to FIG. 12, only the fifth data line (that is, DL_5), from among the first to eighth data lines (that is, DL_1 to DL_8), is a data line corresponding to a piece of first pixel data and a piece of second pixel data, which have the same value in the value of two upper bits thereof. Therefore, the source driver 114*c* (see FIG. 11) may respectively output a charge sharing signal at an active level to switches respectively connected with the remaining data lines except for the fifth data line (that is, DL_5) (this may be confirmed with reference to FIG. 13).

Figure 13:
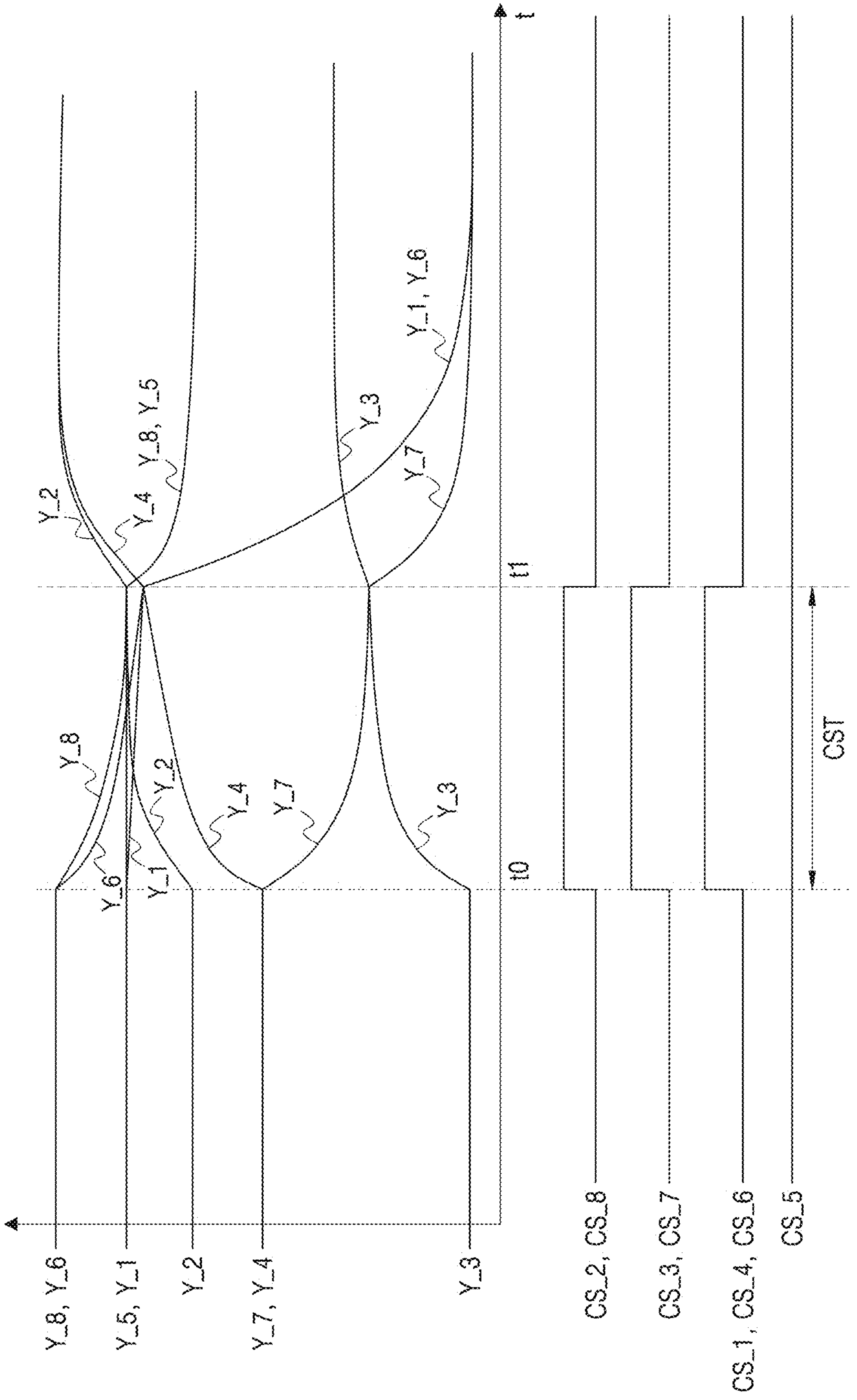
FIG. 13 is a timing diagram illustrating a data voltage and a charge sharing signal, according to an example embodiment.

FIG. 13 is a timing diagram illustrating a data voltage and a charge sharing signal, according to an example embodiment.

Descriptions regarding FIG. 13 may be made with reference to FIG. 12, and repeated descriptions may be omitted. Specifically, FIG. 13 illustrates the first to eighth data voltages (that is, Y_1 to Y_8) of the respective pieces of second pixel data of FIG. 12 and also illustrates the charge sharing signals CS_1 to CS_N generated by the charge sharing controller 340*c* (see FIG. 11) based on the types of the pieces of second pixel data of FIG. 12.

In the graph of FIG. 13 for illustrating data voltages, the horizontal axis represents time and the vertical axis represents voltage levels. The respective voltage levels of the first to eighth data voltages (that is, Y_1 to Y_8) are based on the respective three most significant bits of the pieces of pixel data of FIG. 4. For example, when the three most significant bits of a piece of pixel data is 000, the piece of pixel data may correspond to a data voltage having a relatively high voltage level. On the other hand, when the three most significant bits of a piece of pixel data is 111, the piece of pixel data may correspond to a data voltage having a relatively low voltage level.

Referring to FIGS. 12 and 13, the charge sharing controller 340*c* (see FIG. 11) may output the charge sharing signals CS_1 to CS_4 and CS_5 to CS_8 having active levels, during the charge sharing time CST, based on the types of the pieces of second pixel data of FIG. 12. Because the type of the piece of second pixel data corresponding to the fifth data line (that is, DL_5 of FIG. 12) is "maintain", the charge sharing controller 340*c* (see FIG. 11) may not output the charge sharing signal CS_5 at an active level (i.e., may not output a charge sharing signal or output a charge sharing signal at an inactive level) to the first switch, the second switch, and the third switch, which are connected to the fifth data line (that is, DL_5 of FIG. 12).

Referring to FIG. 13, the charge sharing controller 340*c* (see FIG. 11) may perform charge sharing by connecting the first charge sharing line CSL_1 (see FIG. 11) with data lines each corresponding to a piece of first pixel data and a piece of second pixel data, which each have a value of 0 in the uppermost bit thereof and have a difference of 2 or more therebetween in the value of the remaining two upper bits thereof except for the uppermost bit, from among the plurality of data lines DL_1 to DL_N (see FIG. 11), may perform charge sharing by connecting the second charge sharing line CSL_2 (see FIG. 11) with data lines each corresponding to a piece of first pixel data and a piece of second pixel data, which each have a value of 1 in the uppermost bit thereof and have a difference of 2 or more therebetween in the value of the remaining two upper bits thereof except for the uppermost bit, from among the plurality of data lines DL_1 to DL_N (see FIG. 11), and may perform charge sharing by connecting the third charge sharing line CSL_3 (see FIG. 11) with data lines each corresponding to a piece of first pixel data and a piece of second pixel data, which are different from each other in the uppermost bit thereof and have a difference of 2 or more therebetween in the value of the two upper bits including the uppermost bit thereof, from among the plurality of data lines DL_1 to DL_N (see FIG. 11).

Figure 14:
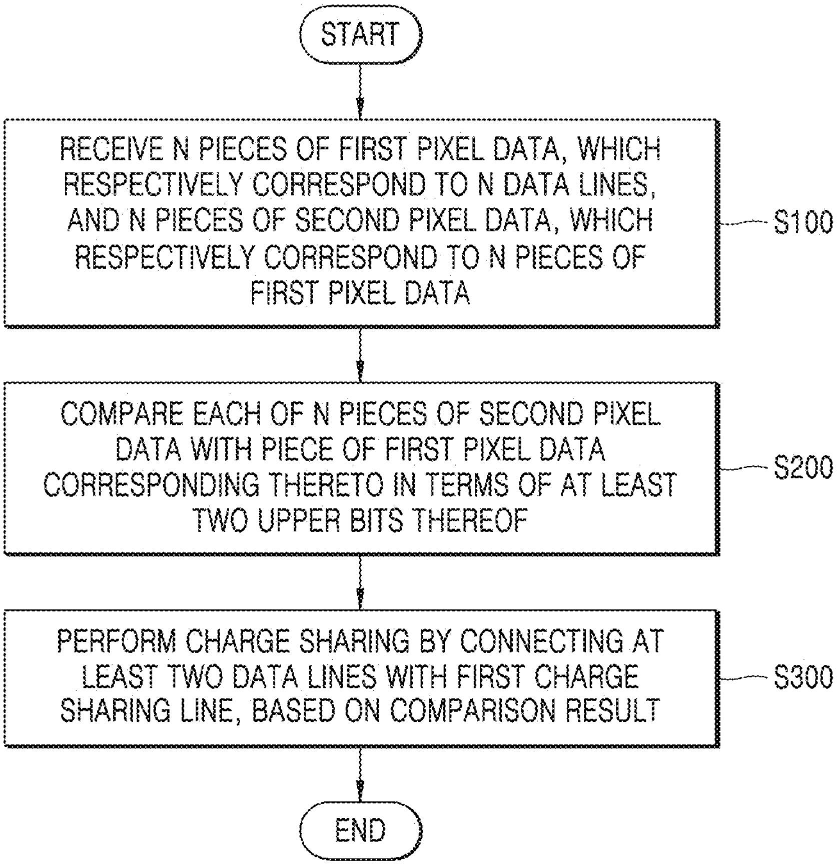
FIG. 14 is a flowchart illustrating a method of operating a source driver, according to an example embodiment.

FIG. 14 is a flowchart illustrating a method of operating a source driver, according to an example embodiment. The method of operating a source driver of FIG. 14 may be performed on each of the source drivers of FIGS. 2, 3, 8, and 11.

Referring to FIG. 14, a source driver may receive N pieces of first pixel data, which respectively correspond to N data lines, and N pieces of second pixel data, which respectively correspond to the N pieces of first pixel data (S100). N is an integer of 2 or more, and the source driver may receive a $K-1^{-th}$ data packet, which includes the N pieces of first pixel data respectively corresponding to the N data lines, and then receive a $K^{-th}$ data packet, which includes the N pieces of second pixel data respectively corresponding to the N pieces of first pixel data (S100). The $K-1^{-th}$ data packet and the $K^{-th}$ data packet may be referred to as consecutive data packets.

The source driver may compare each of the N pieces of first pixel data with a piece of second pixel data corresponding thereto in terms of at least two upper bits thereof (S200). For example, the source driver may compare a piece of first pixel data and a piece of second pixel data, which correspond to the same data line, with each other in terms of two upper bits thereof. When the piece of first pixel data and the piece of second pixel data have a difference of 2 or more therebetween in the value of the two upper bits thereof, the source driver may determine the type of the piece of second pixel data to be "rise" or "fall".

In addition, the source driver may compare a piece of first pixel data and a piece of second pixel data, which correspond to the same data line, in terms of three upper bits thereof. When the piece of first pixel data and the piece of second pixel data have the same value of 0 in the uppermost bit from among the three upper bits thereof and have a difference of 2 or more therebetween in the value of the remaining two upper bits thereof except for the uppermost bit, the source driver may determine the type of the piece of second pixel data to be "first group rise" or "first group fall". Similarly, when the piece of first pixel data and the piece of second pixel data have the same value of 1 in the uppermost bit from among the three upper bits thereof and have a difference of 2 or more therebetween in the value of the remaining two upper bits thereof except for the uppermost bit, the source driver may determine the type of the piece of second pixel data to be "second group rise" or "second group fall".

The source driver may perform charge sharing by connecting at least two data lines with a first charge sharing line, based on a comparison result (S300). The source driver may perform charge sharing by connecting the first charge sharing line with, from among a plurality of data lines, data lines each corresponding to a piece of first pixel data and a piece of second pixel data, which have a difference of 2 or more therebetween in the value of two upper bits thereof.

As described above, the source driver may further include a second charge sharing line, which may be individually connected with each of the N data lines, and a third charge sharing line, which may be individually connected with each of the N data lines. The source driver may perform charge sharing by connecting the second charge sharing line with, from among the N data lines, at least two data lines each corresponding to a piece of first pixel data and a piece of second pixel data, which each have a value of 0 in the uppermost bit thereof and have a difference of 2 or more therebetween in the value of two upper bits thereof except for the uppermost bit. Similarly, the source driver may perform charge sharing by connecting the third charge sharing line with, from among the N data lines, at least two data lines each corresponding to a piece of first pixel data and a piece of second pixel data, which each have a value of 0 in the uppermost bit thereof and have a difference of 2 or more therebetween in the value of two upper bits thereof except for the uppermost bit.

The terms “first”, “second”, and “third” contained in the terms “first charge sharing line”, “second charge sharing line”, and “third charge sharing line” as used above are for distinguishing them from each other, and example embodiments are not limited thereto.

Figure 15:
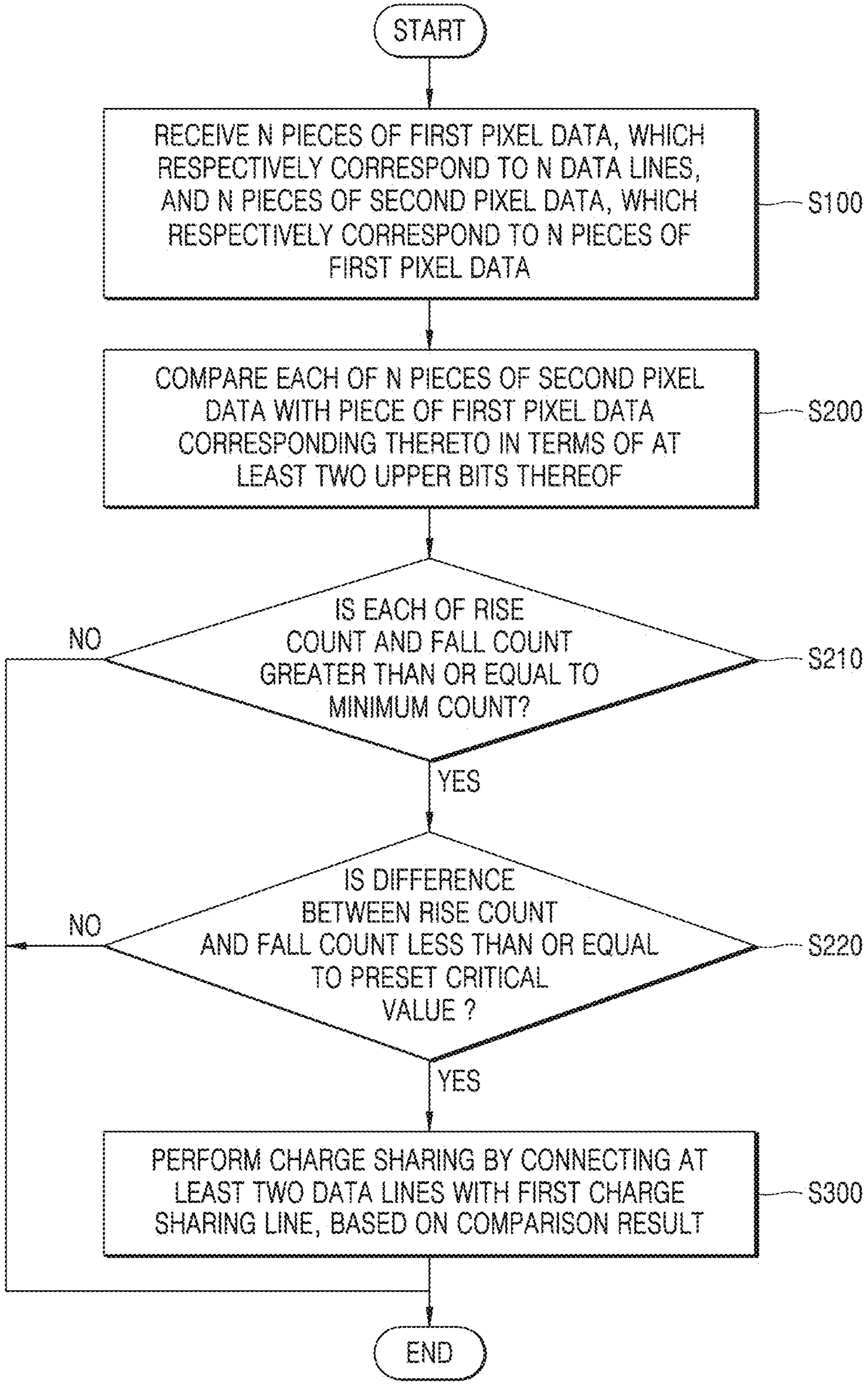
FIG. 15 is a flowchart illustrating a method of operating a source driver, according to an example embodiment.

FIG. 15 is a flowchart illustrating a method of operating a source driver, according to an example embodiment. The method of operating a source driver of FIG. 15 may be performed on each of the source drivers of FIGS. 2, 3, 8, and 11. Descriptions regarding FIG. 15 may be made with reference to FIG. 14, and because operation S100 and operation S300 in FIG. 14 are repeated in FIG. 15, descriptions thereof are omitted here. Although it is described in FIG. 15 that a source driver performs charge sharing when all the respective conditions of operation S220 and operation S210 are satisfied, this is only for convenience of description, and example embodiments are not limited thereto. A source driver according to an example embodiment may perform charge sharing even when only the condition of at least one of operation S210 and operation S220 is satisfied.

Referring to FIG. 15, the source driver may compare each of the N pieces of first pixel data with a piece of second pixel data corresponding thereto in terms of at least two upper bits thereof (S200).

The source driver according to an example embodiment may count the number of pieces of second pixel data having a type of “rise” (referred to as a rise count hereinafter) and the number of pieces of second pixel data having a type of “fall” (referred to as a fall count hereinafter), based on a result of the comparison. For example, referring to FIG. 6, the rise count may be 2 and the fall count may be 1.

The source driver according to an example embodiment may count the number of pieces of second pixel data having a type of “first group rise” or “second group rise” (referred to as a rise count hereinafter) and the number of pieces of second pixel data having a type of “first group fall” or “second group fall” (referred to as a fall count hereinafter), based on the result of the comparison. For example, referring to FIG. 9, the rise count may be 2 and the fall count may be 2.

The source driver according to an example embodiment may count the number of pieces of second pixel data having a type of “rise”, “first group rise”, or “second group rise” (referred to as a rise count hereinafter) and the number of pieces of second pixel data having a type of “fall”, “first group fall”, or “second group fall” (referred to as a fall count hereinafter), based on the result of the comparison. For example, referring to FIG. 12, the rise count may be 4 and the fall count may be 3.

The source driver according to an example embodiment may count the respective numbers of pieces of second pixel data respectively having types of “rise”, “first group rise”, and “second group rise” (respectively referred as a first rise count, a second rise count, and a third rise count, hereinafter), based on the result of the comparison. Similarly, the source driver according to an example embodiment may count the respective numbers of pieces of second pixel data respectively having types of “fall”, “first group fall”, and “second group fall” (respectively referred as a first fall count, a second fall count, and a third fall count, hereinafter), based on the result of the comparison. For example, referring to FIG. 12, the first, second, and third rise counts may be 2, 1, and 1, respectively, and the first, second, and third fall counts may be 1, 1, and 1, respectively.

The first rise count, the second rise count, and the third rise count, which are set forth above, are used for convenience of description and are representations encompassed in the rise count. Similarly, the first fall count, the second fall count, and the third fall count, which are set forth above, are used for convenience of description and are conceptually encompassed in the fall count. For example, the rise count in operations S210 and S220 of FIG. 15 described below may refer to at least one of the first rise count, the second rise count, and the third rise count. Similarly, the fall count may refer to at least one of the first fall count, the second fall count, and the third fall count. Specifically, the rise count described above with reference to FIG. 9 may refer to the sum of the second rise count and the third rise count. In addition, the rise count described above with reference to FIG. 12 may refer to the sum of the first rise count, the second rise count, and the third rise count. In this way, the fall count would also be similarly understood.

The source driver may determine whether each of the rise count and the fall count is greater than or equal to a minimum count (S210). The minimum count is a preset value and may refer to the minimum value of each of the rise count and the fall count for the source driver to perform charge sharing. Although the minimum count may be differently set, example embodiments are not limited thereto.

When at least one of the rise count and the fall count is less than the minimum count, the source driver may not perform charge sharing.

Because specific operations for the source driver to perform charge sharing are described above, descriptions of specific methods related to performing charge sharing are omitted hereinafter.

Operation S210 is described below in detail with reference to the aforementioned operation S200.

For example, referring to FIG. 6, when the minimum count is 1, the source driver may perform charge sharing on the data lines DL_1, DL_4, and DL_6 corresponding to the pieces of second pixel data having a type of “rise” or “fall”. On the other hand, when the minimum count is 2, the source driver may not perform charge sharing because the fall count is 1.

Similarly, referring to FIG. 9, when the minimum count is 3, the source driver may not perform charge sharing (because the fall count is 2). On the other hand, when the minimum count is 1, the source driver may perform charge sharing on the data lines DL_2, DL_3, DL_7, and DL_8 each corresponding to a piece of second pixel data having a type of one of “first group rise”, “second group rise”, “first group fall”, and “second group fall”. Here, as described above, the source driver may perform charge sharing separately on each set of the data lines respectively corresponding to pieces of second pixel data falling within the same group (for example, the source driver may separately and respectively perform charge sharing on DL_2 and DL_8 and on DL_3 and DL_7 by connecting DL_2 and DL_8 to each other and by connecting DL_3 and DL_7 to each other).

Similarly, referring to FIG. 12, when the minimum count is 4, the source driver may not perform charge sharing (because the fall count is 3). On the other hand, when the minimum count is 2, the source driver may perform charge sharing on the data lines DL_1, DL_2, DL_3, DL_4, DL_6, DL_7, and DL_8 each corresponding to a piece of second pixel data having a type of one of “rise”, “first group rise”, “second group rise”, “fall”, “first group fall”, and “second group fall”. Here, as described above, the source driver may perform charge sharing separately on each set of the data lines respectively corresponding to pieces of second pixel data falling within the same group (for example, the source driver may separately and respectively perform charge sharing on DL_1, DL_4, and DL_6, on DL_2 and DL_8, and on DL_3 and DL_7 by connecting DL_1, DL_4, and DL_6 to each other, by connecting DL_2 and DL_8 to each other, and by connecting DL_3 and DL_7 to each other).

As described above with reference to operation S200, the source drive may calculate each of the first rise count, the second rise count, and the third rise count and may calculate each of the first fall count, the second fall count, and the third fall count. The source driver may determine whether each of the first rise count and the first fall count is greater than or equal to a first minimum count and may determine whether each of the second rise count and the second fall count is greater than or equal to a second minimum count. In addition, the source driver may determine whether each of the third rise count and the third fall count is greater than or equal to a third minimum count. Here, the first minimum count, the second minimum count, and the third minimum count are each a preset value and may be equal to or different from each other. The first minimum count may refer to the minimum value of each of the first rise count and the first fall count for performing charge sharing on data lines each corresponding to a piece of second pixel data having a type of "rise" or "fall". The second minimum count and the third minimum count may be comprehended from the description made above and the following examples described below, and thus, descriptions thereof are omitted.

Referring to FIG. 12, the first rise count is 2, the first fall count is 1, the second rise count is 1, the second fall count is 1, the third rise count is 1, and the third rise count is 1. Here, when the first minimum count is 1, the second minimum count is 2, and the third minimum count is 1, the source driver may perform charge sharing by connecting the first data line (that is, DL_1), the fourth data line (that is, DL_4), and the sixth data line (that is, DL_6) to each other (because each of the first rise count and the first fall count is greater than or equal to the first minimum count) and may perform charge sharing by connecting the third data line (that is, DL_3) and the seventh data line (that is, DL_7) to each other (because each of the third rise count and the third fall count is greater than or equal to the third minimum count). Therefore, the first data line (that is, DL_1), the fourth data line (that is, DL_4), and the sixth data line (that is, DL_6) may share the respective charges thereof with each other, and the third data line (that is, DL_3) and the seventh data line (That is, DL_7) may share the respective charges thereof with each other. On the other hand, the source driver may not perform charge sharing on the second data line (that is, DL_2) and the eighth data line (that is, DL_8), each corresponding to a piece of second pixel data having a type of "first group fall" or "first group rise" (because one of the second rise count and the second fall count is less than the second minimum count).

The source driver may determine whether a difference between the rise count and the fall count is less than or equal to a preset critical value (S220). The critical value is a preset value and may refer to the minimum value of the difference between the rise count and the fall count for the source driver to perform charge sharing. Although the critical value may be differently set, example embodiments are not limited thereto.

When the difference between the rise count and the fall count is greater than the preset critical value, the source driver may not perform charge sharing.

For example, referring to FIG. 6, the rise count is 2 and the fall count is 1. In addition, when the preset critical value is 1, the source driver may perform charge sharing by connecting the data lines DL_1, DL_4, and DL_6 to each other. On the other hand, when the preset critical value is 0, the source driver may not perform charge sharing.

Referring to FIG. 12, the first rise count is 2, the first fall count is 1, the second rise count is 1, the second fall count is 1, the third rise count is 1, and the third fall count is 1. In addition, when a first critical value, a second critical value, and a third critical value, which are preset, are 0, 0, and 0, respectively, the source driver may not perform charge sharing on the first data line (that is, DL_1), the fourth data line (that is, DL_4), and the sixth data line (that is, DL_6) (because a difference between the first rise count and the first fall count is greater than the first critical value), may perform charge sharing on the second data line (that is, DL_2) and the eighth data line (that is, DL_8) by connecting the second data line (that is, DL_2) and the eighth data line (that is, DL_8) to each other (because a difference between the second rise count and the second fall count is less than or equal to the second critical value), and may perform charge sharing on the third data line (that is, DL_3) and the seventh data line (that is, DL_7) by connecting the third data line (that is, DL_3) and the seventh data line (that is, DL_7) to each other (because a difference between the third rise count and the third fall count is less than or equal to the third critical value). Therefore, the second data line (that is, DL_2) and the eighth data line (that is, DL_8) may share the respective charges thereof with each other, and the third data line (that is, DL_3) and the seventh data line (that is, DL_7) may share the respective charges thereof with each other.

Here, the first critical value, the second critical value, and the third critical value are each a preset value and may be equal to or different from each other. The first critical value may refer to the minimum value of the difference between the first rise count and the first fall count for the source driver to perform charge sharing on data lines each corresponding to a piece of second pixel data having a type of "rise" or "fall". The second critical value and the third critical value may be comprehended from the description made above, and thus, descriptions thereof are omitted.

In the examples described with reference to FIGS. 6 and 12, it has been described that the difference between the rise count and the fall count is an absolute value of a value obtained by subtracting the fall count from the rise count. However, example embodiments are not limited thereto, and a ratio between the rise count and the fall count or the like may be used instead of the difference between the rise count and the fall.

In operation S220, descriptions regarding FIG. 9 have been omitted. This is because the example of FIG. 9 may also be easily comprehended from the examples described in operations S210 and S220 with reference to FIGS. 6 and 12, and it is not intended to exclude the example of FIG. 9.

Figure 16:
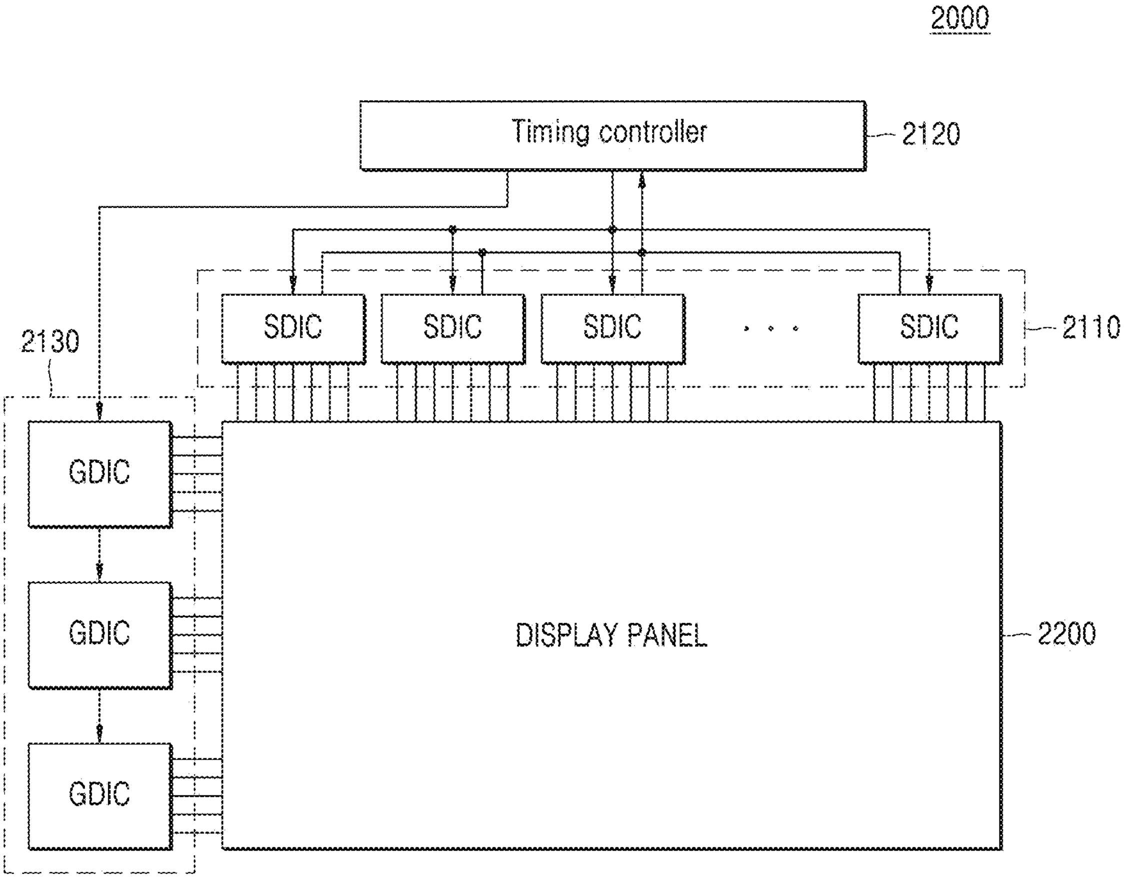
FIG. 16 illustrates an example of a display device according to an example embodiment.

FIG. 16 illustrates an example of a display device according to an example embodiment.

A display device 2000 of FIG. 16 is a device including a medium-to-large-sized display panel 2200 may be applied to, for example, a television, a monitor, and the like.

Referring to FIG. 16, the display device 2000 may include a source driver 2110, a timing controller 2120, a gate driver 2130, and the display panel 2200. The display device 2000 may correspond to the display device 100 of FIG. 1, and the source driver 2110, the timing controller 2120, the gate driver 2130, and the display panel 2200 may respectively correspond to the source driver 114, the timing controller 111, the gate driver 112, and the display panel 120 of FIG. 2.

The timing controller 2120 may include one or more ICs or modules. The timing controller 2120 may communicate with a plurality of source driver ICs SDIC and a plurality of gate driver ICs GDIC via an interface that is set.

The timing controller 2120 may generate control signals for controlling driving timings of the plurality of source driver ICs SDIC and the plurality of gate driver ICs GDIC and provide the control signals to the plurality of source driver ICs SDIC and the plurality of gate driver ICs GDIC.

The source driver 2110 may include the plurality of source driver ICs SDIC, and the plurality of source driver ICs SDIC may be mounted on a circuit film, such as a tape carrier package (TCP), a chip-on-film (COF), or a flexible printed circuit (FPC), and thus attached to the display panel 2200 in a taped-automatic bonding (TAB) manner or mounted on a non-display area of the display panel 2200 in a chip-on-glass (COG) manner.

The gate driver 2130 may include the plurality of gate driver ICs GDIC, and the plurality of gate driver ICs GDIC may be mounted on a circuit film and thus attached to the display panel 2200 in a TAB manner or mounted on the non-display area of the display panel 2200 in a COG manner. Alternatively, the gate driver 2130 may be directly formed on a lower substrate of the display panel 2200 in a gate-driver in panel (GIP) manner. The gate driver 2130 may be arranged in the non-display area outside a pixel array, in which pixels are formed, in the display panel 2200 and may be formed by the same TFT process as the pixels.

As described above with reference to FIGS. 1 to 15, the source driver 2110 may connect a charge sharing line with at least two data lines each corresponding to a piece of first pixel data and a piece of second pixel data, which are different from each other in at least two upper bits thereof, from among N data lines (where N is an integer of 2 or more) and thus perform charge sharing on the at least two data lines, thereby reducing or preventing unnecessary power consumption that may be generated due to charge sharing.

Figure 17:
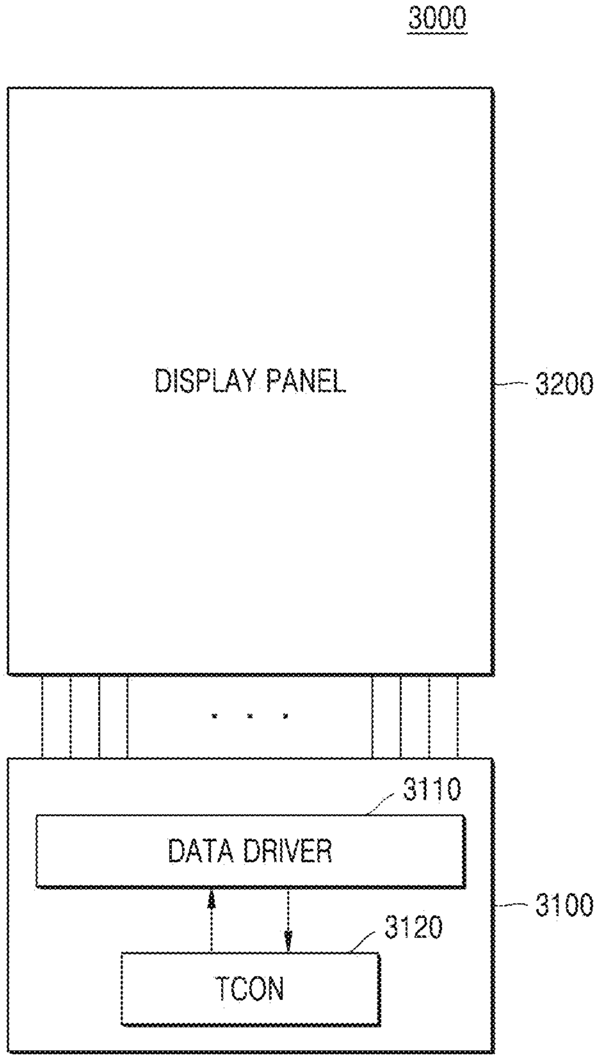
FIG. 17 illustrates an example of a display device according to an example embodiment.

FIG. 17 illustrates an example of a display device according to an example embodiment.

A display device 3000 of FIG. 17 is a device including a small-sized display panel 3200 and may be applied to, for example, mobile devices, such as a smartphone and a tablet PC.

Referring to FIG. 17, the display device 3000 may include a display driving circuit 3100 and a display panel 3200. The display device 3000 may correspond to the display device 100 of FIG. 1, and the display driving circuit 3100 and the display panel 3200 may respectively correspond to the display driving circuit 110 and the display panel 120 of FIG. 2. The display driving circuit 3100 may include one or more ICs and may be mounted on a circuit film, such as a TCP, a COF, or an FPC, to be attached to the display panel 3200 in a TAB manner or mounted on a non-display area (for example, an area on which an image is not displayed) of the display panel 3200 in a COG manner.

The display driving circuit 3100 may include a source driver 3110 and a timing controller 3120 and may further include a gate driver. In an example embodiment, the gate driver may be mounted in the display panel 3200.

As described above with reference to FIGS. 1 to 15, the source driver 3110 may connect a charge sharing line with at least two data lines each corresponding to a piece of first pixel data and a piece of second pixel data, which are different from each other in at least two upper bits thereof, from among N data lines (where N is an integer of 2 or more) and thus perform charge sharing on the at least two data lines, thereby reducing or preventing unnecessary power consumption that may be generated due to charge sharing.

While aspects of example embodiments have been particularly shown and described, it will be understood that various changes in form and details may be made therein without departing from the spirit and scope of the following claims.

What is claimed is:

1. A method of operating a source driver that includes a first charge sharing line capable of being individually connected with each of N data lines, the method comprising:

receiving N pieces of first pixel data, which respectively correspond to the N data lines, and N pieces of second pixel data, which respectively correspond to the N pieces of first pixel data;

comparing each of the N pieces of second pixel data with a piece of first pixel data corresponding thereto in terms of at least two upper bits thereof; and performing charge sharing by connecting the first charge sharing line with a first group of the N data lines, based on a result of the comparing, wherein N is an integer of 2 or more.

2. The method of claim 1, wherein the performing of the charge sharing comprises connecting the first charge sharing line with the first group of the N data lines, based on each of the first group of the N data lines corresponding to a piece of the first pixel data and a piece of the second pixel data, which have a difference of 2 or more therebetween in two upper bits thereof.

3. The method of claim 2, further comprising determining whether each of a first number of pieces of the second pixel data, which each include two upper bits having a value that is greater than that of two upper bits of a piece of the first pixel data corresponding thereto by 2 or more from among the N pieces of second pixel data, and a second number of pieces of the second pixel data, which each include two upper bits having a value that is less than that of two upper bits of a piece of the first pixel data corresponding thereto by 2 or more from among the N pieces of the second pixel data, is greater than or equal to a minimum count that is preset.

4. The method of claim 3, further comprising determining whether a difference between the first number of pieces of second pixel data and the second number of pieces of second pixel data is less than that of two upper bits of a piece of the first pixel data corresponding thereto by 2 or more from among the N pieces of second pixel data, is less than or equal to a critical value that is preset.

5. The method of claim 2, wherein the source driver further includes a second charge sharing line capable of being individually connected with each of the N data lines, and wherein the performing of the charge sharing comprises connecting the second charge sharing line with a second group of the N data lines, based on each of the second group of the N data lines corresponding to a piece of the first pixel data and a piece of the second pixel data, which each have a value of 0 in an uppermost bit thereof and have a difference of 2 or more therebetween in two upper bits thereof except for the uppermost bit.

6. The method of claim 5, wherein the source driver further includes a third charge sharing line capable of being individually connected with each of the N data lines, and wherein the performing of the charge sharing comprises connecting the third charge sharing line with a third group of the N data lines, based on each of the third group of the N data lines corresponding to a piece of the first pixel data and a piece of the second pixel data, which each have a value of 1 in an uppermost bit thereof and have a difference of 2 or more therebetween in two upper bits thereof except for the uppermost bit.

7. The method of claim 2, wherein the performing of the charge sharing comprises performing the charge sharing on the first group of the N data lines connected with the first charge sharing line to be at an average voltage of voltages respectively corresponding to the first group of the N data lines connected with the first charge sharing line.

8. The method of claim 6, wherein the charge sharing is performed on the second group of the N data lines connected with the second charge sharing line to be at an average voltage of voltages respectively corresponding to the second group of the N data lines connected with the second charge sharing line, and wherein the charge sharing is performed on the third group of the N data lines connected with the third charge sharing line to be at an average voltage of voltages respectively corresponding to the third group of the N data lines connected with the third charge sharing line.

* * * * *